(12) United States Patent
Myers et al.

(10) Patent No.: US 12,118,341 B2
(45) Date of Patent: *Oct. 15, 2024

(54) CONVERSION AND RESTORATION OF COMPUTER ENVIRONMENTS TO CONTAINER-BASED IMPLEMENTATIONS

(71) Applicant: MicroStrategy Incorporated, Vienna, VA (US)

(72) Inventors: Clayton Myers, Oak Hill, VA (US); Brett E. Morris, Arlington, VA (US); Andrew Scott Mears, Leesburg, VA (US); Shreyas Shah, Vienna, VA (US); Martin Lucius Bonica, Leesburg, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/665,119

(22) Filed: Feb. 4, 2022

(65) Prior Publication Data

US 2022/0229649 A1  Jul. 21, 2022

Related U.S. Application Data

(63) Continuation of application No. 16/542,023, filed on Aug. 15, 2019, now Pat. No. 11,288,053.

(51) Int. Cl.
*G06F 8/61* (2018.01)
*G06F 8/60* (2018.01)
(Continued)

(52) U.S. Cl.
CPC .......... *G06F 8/63* (2013.01); *G06F 8/60* (2013.01); *G06F 8/61* (2013.01); *G06F 8/65* (2013.01);
(Continued)

(58) Field of Classification Search
CPC ............................................. G06F 8/63
(Continued)

(56) References Cited

U.S. PATENT DOCUMENTS 6,334,158 B1  12/2001  Jennyc et al.
6,339,795 B1  1/2002  Narukar et al.
(Continued)

FOREIGN PATENT DOCUMENTS

WO  WO-2018197928 A1 * 11/2018 .............. B60J 7/223

OTHER PUBLICATIONS

Office Action in U.S. Appl. No. 16/541,763, dated Apr. 26, 2022, 24 pages.
(Continued)

*Primary Examiner* — Francisco J Aponte
(74) *Attorney, Agent, or Firm* — Fish & Richardson P.C.

(57) ABSTRACT

Methods, systems, and apparatus, including computer programs encoded on computer-storage media, for conversion and restoration of computer environments to container-based implementations. In some implementations, an archive of configuration data for a server system is obtained, where the server system includes at least one application. A set of multiple software images is generated, where the multiple software images are generated such that they divide the functionality of at least one application among the respective containers. In generating the set of multiple software images, settings of the at least one application are identified based on the configuration data in the archive, a subset of the settings is selected for each of the software images, and the selected subsets of settings are converted into converted subsets of settings for the respective software images.

20 Claims, 9 Drawing Sheets

(51) Int. Cl.
  *G06F 8/65*    (2018.01)
  *G06F 8/71*    (2018.01)
  *G06F 11/14*   (2006.01)

(52) U.S. Cl.
  CPC ............ *G06F 8/71* (2013.01); *G06F 11/1451* (2013.01); *G06F 11/1469* (2013.01); *G06F 2201/84* (2013.01)

(58) Field of Classification Search
  USPC ....................................................... 717/177
  See application file for complete search history.

(56) References Cited

U.S. PATENT DOCUMENTS

| | | | |
|---|---|---|---|
| 6,691,245 | B1 | 2/2004 | DeKoning |
| 7,457,248 | B1 | 11/2008 | Ali et al. |
| 7,784,049 | B1 | 8/2010 | Gandler |
| 7,917,617 | B1 | 3/2011 | Ponnapur et al. |
| 8,238,913 | B1 | 8/2012 | Bhattacharyya et al. |
| 8,285,681 | B2 | 10/2012 | Prahlad et al. |
| 8,887,132 | B1 | 11/2014 | Hunter |
| 9,122,562 | B1 | 9/2015 | Stickle |
| 9,189,294 | B2 | 11/2015 | Considine et al. |
| 9,270,449 | B1 | 2/2016 | Tribble et al. |
| 9,367,305 | B1* | 6/2016 | Kumar ...................... G06F 8/30 |
| 9,674,294 | B1 | 6/2017 | Gonthier et al. |
| 9,767,312 | B2 | 9/2017 | Sahoo et al. |
| 9,928,210 | B1 | 3/2018 | Zhang et al. |
| 9,959,104 | B2 | 5/2018 | Chen et al. |
| 9,965,261 | B2 | 5/2018 | Chen et al. |
| 9,986,427 | B2 | 5/2018 | Kimpe |
| 10,002,247 | B2* | 6/2018 | Suarez ................ G06F 9/45558 |
| 10,007,509 | B1 | 6/2018 | Quershi et al. |
| 10,101,985 | B1 | 10/2018 | Prakash et al. |
| 10,169,023 | B2 | 1/2019 | Ciano et al. |
| 10,191,778 | B1 | 1/2019 | Yang et al. |
| 10,241,778 | B2 | 3/2019 | Emeis et al. |
| 10,244,034 | B2 | 3/2019 | Joshi et al. |
| 10,261,782 | B2 | 4/2019 | Suarez et al. |
| 10,310,949 | B1 | 6/2019 | Chakraborty et al. |
| 10,318,280 | B2 | 6/2019 | Islam et al. |
| 10,356,214 | B2 | 7/2019 | Joshi et al. |
| 10,389,582 | B1 | 8/2019 | Fakhouri et al. |
| 11,023,270 | B2 | 6/2021 | Mahajan et al. |
| 11,062,022 | B1 | 7/2021 | Kalamkar et al. |
| 11,106,455 | B2 | 8/2021 | Myers et al. |
| 11,182,193 | B2* | 11/2021 | Skourtis .............. G06F 9/45558 |
| 11,288,053 | B2 | 3/2022 | Myers et al. |
| 11,379,207 | B2* | 7/2022 | Scheinkman ....... G06F 9/45558 |
| 11,416,243 | B2* | 8/2022 | Hwang ................... H04L 41/16 |
| 11,567,755 | B2 | 1/2023 | Myers et al. |
| 2002/0157089 | A1 | 10/2002 | Patel et al. |
| 2005/0060722 | A1 | 3/2005 | Rochette et al. |
| 2008/0109448 | A1 | 5/2008 | Aboel-Nil et al. |
| 2008/0216056 | A1 | 9/2008 | Bate et al. |
| 2008/0243660 | A1 | 10/2008 | Amemiya et al. |
| 2009/0070462 | A1 | 3/2009 | Saenz et al. |
| 2011/0289503 | A1 | 11/2011 | Toub et al. |
| 2012/0117620 | A1 | 5/2012 | Cassidy |
| 2013/0080514 | A1 | 3/2013 | Gupta et al. |
| 2013/0339299 | A1 | 12/2013 | Muller et al. |
| 2014/0020048 | A1 | 1/2014 | Snodgrass |
| 2014/0089033 | A1 | 3/2014 | Snodgrass |
| 2015/0019488 | A1 | 1/2015 | Balch et al. |
| 2015/0326432 | A1 | 11/2015 | Fujie et al. |
| 2015/0373097 | A1 | 12/2015 | Konkus et al. |
| 2016/0044040 | A1 | 2/2016 | Caffary, Jr. |
| 2016/0055067 | A1 | 2/2016 | Bensinger |
| 2016/0139887 | A1 | 5/2016 | Pudiyapura et al. |
| 2016/0162277 | A1 | 6/2016 | Fenzl et al. |
| 2016/0335106 | A1 | 11/2016 | Behere et al. |
| 2016/0335108 | A1 | 11/2016 | Ryu et al. |
| 2016/0350205 | A1 | 12/2016 | Acharya et al. |
| 2017/0090972 | A1 | 3/2017 | Ryu et al. |
| 2017/0093923 | A1 | 3/2017 | Duan |
| 2017/0147319 | A1 | 5/2017 | Riek et al. |
| 2017/0154017 | A1 | 6/2017 | Kristiansson et al. |
| 2017/0177860 | A1 | 6/2017 | Suarez et al. |
| 2017/0177877 | A1 | 6/2017 | Suarez et al. |
| 2017/0185488 | A1 | 6/2017 | Kumarasamy et al. |
| 2017/0300311 | A1 | 10/2017 | Lopez et al. |
| 2017/0315795 | A1 | 11/2017 | Keller |
| 2018/0013616 | A1 | 1/2018 | Abadi et al. |
| 2018/0074855 | A1 | 3/2018 | Kambatla |
| 2018/0075086 | A1 | 3/2018 | Yam et al. |
| 2018/0088926 | A1 | 3/2018 | Abrams |
| 2018/0088935 | A1 | 3/2018 | Church et al. |
| 2018/0095778 | A1 | 4/2018 | Aydelott et al. |
| 2018/0095973 | A1 | 4/2018 | Huang et al. |
| 2018/0136931 | A1 | 5/2018 | Hendrich et al. |
| 2018/0157516 | A1 | 6/2018 | Kristiansson et al. |
| 2018/0173502 | A1 | 6/2018 | Biskup et al. |
| 2018/0173522 | A1 | 6/2018 | Hamill et al. |
| 2018/0205652 | A1 | 7/2018 | Saxena |
| 2018/0278725 | A1* | 9/2018 | Thayer ................. G06F 16/252 |
| 2018/0285199 | A1 | 10/2018 | Mitkar et al. |
| 2018/0285210 | A1 | 10/2018 | Mitkar et al. |
| 2018/0285353 | A1 | 10/2018 | Rao et al. |
| 2018/0341471 | A1 | 11/2018 | Stefanov et al. |
| 2019/0034313 | A1 | 1/2019 | Vedurumudi et al. |
| 2019/0050680 | A1 | 2/2019 | Waugh et al. |
| 2019/0095254 | A1 | 3/2019 | Rao |
| 2019/0109857 | A1 | 4/2019 | Caffary, Jr. |
| 2019/0123956 | A1 | 4/2019 | Satapathy et al. |
| 2019/0132329 | A1 | 5/2019 | Verberkt et al. |
| 2019/0163559 | A1 | 5/2019 | Takahashi et al. |
| 2019/0208031 | A1 | 7/2019 | Bennet et al. |
| 2019/0230130 | A1 | 7/2019 | Beckman et al. |
| 2019/0235897 | A1 | 8/2019 | Goel |
| 2019/0236844 | A1 | 8/2019 | Balasian et al. |
| 2019/0260716 | A1 | 8/2019 | Lerner |
| 2019/0278669 | A1 | 9/2019 | Mueller-Wicke et al. |
| 2019/0303541 | A1 | 10/2019 | Reddy et al. |
| 2019/0354389 | A1 | 11/2019 | Du et al. |
| 2019/0392045 | A1 | 12/2019 | De Lima Junior et al. |
| 2020/0067763 | A1 | 2/2020 | Vytla |
| 2020/0099773 | A1 | 3/2020 | Myers et al. |
| 2020/0356806 | A1 | 11/2020 | Li et al. |
| 2020/0394120 | A1 | 12/2020 | Salmi et al. |
| 2021/0042141 | A1 | 2/2021 | De Marco et al. |
| 2021/0048995 | A1 | 2/2021 | Myers et al. |
| 2021/0048998 | A1 | 2/2021 | Myers et al. |
| 2021/0049002 | A1 | 2/2021 | Myers et al. |
| 2021/0064262 | A1 | 3/2021 | Myers et al. |
| 2021/0240734 | A1 | 8/2021 | Shah et al. |
| 2021/0382846 | A1* | 12/2021 | Miller ....................... G06F 9/52 |
| 2022/0004381 | A1 | 1/2022 | Myers et al. |
| 2022/0147378 | A1* | 5/2022 | Tarasov ................ G06F 16/137 |
| 2022/0215111 | A1 | 7/2022 | Ekins |
| 2022/0222070 | A1 | 7/2022 | Kunjuramanpillai et al. |

OTHER PUBLICATIONS

Brown et al., "A Model of Configuration Complexity and its Application to a Change Management System," 2005 9th IFIP/IEEE International Symposium on Integrated Network Management, 2005. IM 2005, 2005, 631-644.

Notice of Allowance in U.S. Appl. No. 17/377,994, dated Sep. 28, 2022, 12 pages.

Office Action in U.S. Appl. No. 16/780,868, dated Jul. 21, 2022, 12 pages.

Doc-archives.microstrategy.com [online], "Installing and Configuring MicroStrategy Library," Jun. 2017, retrieved on Oct. 25, 2019, retrieved from URL <https://doc-archives.microstrategy.com/producthelp/10.10/InstallConfig/WebHelp/Lang_1033/Content/install_config_library.htm>, 2 pages.

docs.docker.com [online], "Get Started, Part 1: Orientation and setup," 2017, retrieved on Oct. 25, 2019, retrieved from URL<https://docs.docker.com/get-started/>, 6 pages.

Dyn.com "Kubernetes: The Difference Between Containers and Virtual Machines," Feb. 2018, retrieved on Oct. 25, 2019, retrieved

(56) References Cited

OTHER PUBLICATIONS from URL <https://dyn.com/blog/kubernetes-the-difference-between-containers-and-virtual-machines/>, 8 pages.
Edureka.co [online], "Docker tutorial—Introduction to docker & containerization," 2017, retrieved on Oct. 25, 2019, retrieved from URL <https://www.edureka.co/blog/docker-tutorial>, 10 pages.
Kubernetes.io [online], "Concepts underlying the cloud controller manager," May 2019, retrieved on Jun. 20, 2019, retrieved from URL <https://kubernetes.io/docs/concepts/architecture/cloud-controller/>, 9 pages.
Kubernetes.io [online], "StatefulSet is the workload API object used to manage stateful applications," Jun. 2019, retrieved on Jun. 20, 2019, retrieved from URL <https://kubernetes.io/docs/concepts/workloads/controllers/statefulset/>, 9 pages.
Linkedin.com [online], "Moving MicroStrategy to a docker/kubernetes infrastructure," Jan. 2018, retrieved from Oct. 25, 2019, retrieved from URL <https://www.linkedin.com/pulse/moving-microstrategy-dockerkubernetes-infrastructure-montero/>, 3 pages.
linuxize.com [online], "How To Remove Docker Containers, Images, Volumes and Networks," Oct. 2018, retrieved on Oct. 25, 2019, retrieved from URL <https://linuxize.com/post/how-to-remove-docker-images-containers-volumes-and-networks/#remove-one-or-more-containers>, 11 pages.
Ma et al., "Efficient service handoff across edge servers via docker container migration author," 2017, SEC '17: Proceedings of the Second ACM/IEEE Symposium on Edge Computing, 11:1-13.
MicroStrategy.com [online], "Microstrategy on Kubernetes," 2017, retrieved on Oct. 25, 2019, retrieved from URL <https://www.microstrategy.com/getmedia/d99b44dc-ec44-451b-a5a3-3db7160282f0/Genesys-How-to-run-MicroStrategy-on-Kubernetes>, 10 pages.
Singh et al., "Container-based microservice architecture for cloud applications," May 2017, 2017 International Conference on Computing, Communication and Automation (ICCCA), 847-852.
Stackoverflow.com [online] "What's the difference between ClusterIP, NodePort and LoadBalancer service types in Kubernetes?," Jan. 2017, retrieved from URL <https://stackoverflow.com/questions/41509439/whats-the-difference-between-clusterip-nodeport-and-loadbalancer-service-types/52241241#52241241>, 6 pages.
Tao et al., "Dynamic Resource Allocation Algorithm for Container-based Service Computing," 2017, IEEE 13th International Symposium on Autonomous Decentralized Systems—2017 IEEE, 62-67.
Tuton, "Deploy A MongoDB replica set using the IBM Cloud Kubernetes Service," IBM Developer, Mar. 15, 2018, 14 pages.
US Notice of Allowance in U.S. Appl. No. 16/542,058, dated Apr. 12, 2021, 10 pages.
US Office Action in U.S. Appl. No. 16/541,763, dated Dec. 7, 2021, 18 pages.
US Office Action in U.S. Appl. No. 16/542,023, dated Aug. 20, 2021, 14 pages.
US Office Action in U.S. Appl. No. 16/542,023, dated Dec. 2, 2021, 6 pages.
US Office Action in U.S. Appl. No. 16/542,023, dated Mar. 12, 2021, 15 pages.
US Office Action in U.S. Appl. No. 16/542,058, dated Nov. 23, 2020, 18 pages.
US Office Action in U.S. Appl. No. 16/780,868, dated Feb. 3, 2022, 13 pages.
US Office Action in U.S. Appl. No. 16/557,713, dated Feb. 24, 2021, 34 pages.
US Office Action in U.S. Appl. No. 16/557,713, dated Nov. 13, 2020, 25 pages.
Wikipedia.org [online], "Docker(software)," Mar. 2013, retrieved on Oct. 25, 2019, retrieved from URL <https://en.wikipedia.org/wiki/Docker_(software)>, 8 pages.
Wikipedia.org [online], "OS-level virtualization," Aug. 2006, retrieved on Oct. 25, 2019, retrieved from URL <https://en.wikipedia.org/wiki/OS-level_virtualization>, 4 pages.
Wikipedia.org [online], "System Image," Feb. 2013, retrieved Oct. 25, 2019, retrieved from URL <https://en.wikipedia.org/wiki/System_image>, 2 pages.
Wong, "What's the Difference Between Containers and Virtual Machines?," Jul. 15, 2016, Electronic Design, retrieved from URL <http://electronicdesign.com/dev-tools/what-s-difference-between-containers-and-virtualmachines>, 3 pages.
www.en.wikipedia.org [online], "Online Analytical Processing," Mar. 2018, retrieved on Mar. 19, 2020, retrieved from URL <https://en.wikipedia.org/wiki/Online_analytical_processing>, 14 pages.
www2.microstrategy.com [online], "MicroStrategy Intelligence Server," Apr. 2019, retrieved on Oct. 25, 2019, retrieved from URL <https://www2.microstrategy.com/producthelp/10.4/ProjectDesignGuide/WebHelp/Lang_1033/Content/ProjectDesign/MicroStrategy_Intelligence_Server.htm>, 2 pages.
Xu et al.; "Mining Container Image Repositories for Software Configuration and Beyond," 2018 ACM/IEEE 40th International Conference on Software Engineering: New Ideas and Emerging Results—ICSE-NIER'18, May 27-Jun. 3, 2018, 6 pages.
Buyya et al., "Cost-Efficient Orchestration of Containers in Clouds: A Vision, Architectural Elements, and Future Directions," Journal of Physics: Conference Series, Jul. 2018, 1108:1-13.
Office Action in U.S. Appl. No. 16/541,763, dated Nov. 4, 2022, 30 pages.

\* cited by examiner

CONVERSION AND RESTORATION OF COMPUTER ENVIRONMENTS TO CONTAINER-BASED IMPLEMENTATIONS

CROSS-REFERENCE TO RELATED APPLICATIONS

This application is a continuation of U.S. application Ser. No. 16/542,023, filed Aug. 15, 2019, now allowed, which is incorporated by reference.

TECHNICAL FIELD

The present specification relates to containerized deployment for servers.

BACKGROUND

Traditionally, separate servers such as a database server, a document library server, a web server, and a collaboration server are used collectively to provide server functions.

SUMMARY

In some implementations, a system converts an existing server environment or deployment into a set of container-based modules. These container-based modules can be deployed locally or in the cloud. In converting the existing server environment into a set of container-based modules, the system may access an archive including environment data of the server environment and may convert the environment data for the set of container-based modules.

In some implementations, converting the environment data for the set of container-based modules includes translating the unique settings and configuration of the server environment into settings in the container-based deployment that achieve the same configuration result.

In some implementations, in converting the existing server environment or deployment into a set of container-based modules, the system selects the appropriate container modules, external driver modules, and connections between them. The system may also apply additional customized settings inside and outside of the containers.

In one general aspect, a method includes obtaining an archive of configuration data for a server system, where the server system includes at least one application; generating a set of multiple software images configured to provide functionality of the at least one application when the multiple software images are run concurrently as respective containers, where the multiple software images are generated such that they divide the functionality of at least one application among the respective containers. Generating the set of multiple software images includes: identifying settings of the at least one application based on the configuration data in the archive; selecting, for each of the software images, a subset of the settings of the at least one application that are determined to apply to the software image; and converting, for each of the software images, the subset of settings selected for the software image into converted subset of settings for the software image.

Implementations may include one or more of the following features. For example, in some implementations, the server system includes a cloud-based server system.

In some implementations, the server system includes an on-premises server system.

In some implementations, the software images comprise a predetermined set of software images corresponding to the at least one application. In these implementations, generating the set of multiple software images includes updating the predetermined set of software images with the converted subsets of settings.

In some implementations, the method includes creating the archive of configuration data for the server system, where creating the archive includes comparing settings of the server system to a set of reference settings and storing, in the archive, settings identified as different from the corresponding settings in the set of reference settings.

In some implementations, creating the archive of configuration data includes generating a ledger of elements of the installation of the at least one application on the server system that are different from a reference configuration of the at least one application.

In some implementations, the server system is a first server system. In these implementations, the method further includes executing the generated software images as containers using a second server system, such that the containers of the second server system provide the at least one application with a same configuration as the first server system.

In some implementations, the method includes storing the generated software images in and making the generated software images available through a repository of software images.

In some implementations, the at least one application is a first version of the at least one application. In these implementations, the method includes receiving an indication of a second version of the at least one application to be used for a container-based implementation of the at least one application, the second version being different from the first version, and the second version providing a different set of functionality compared to the first version. In these implementations, converting the subsets of settings includes translating settings for the first version to a set of settings for the second version.

In some implementations, selecting the subsets of the settings and/or converting the subsets of settings includes: accessing a set of mapping data that maps settings of the at least one application to different software images; using the mapping data to distribute the settings of the at least one application among the different software images; and translating, based on settings mapping data or translation rules, settings of the at least one application to settings in a format used by the software images.

In some implementations, the archive includes data in a standard format for archiving data including at least one of OLAP data cubes, caches, database dumps, software images, plugins, or metadata configuration settings.

In some implementations, the method includes generating the archive of the at least one application using an automated process performed by one or more computers.

In some implementations, the server system includes multiple applications and/or services, and the method includes generating software images configured to replicate functionality of each of the multiple applications and/or services.

In some implementations, generating the software images includes: distributing data from by the archive among the software images to locations that the software images are configured to retrieve the data when run as containers; and modifying metadata from the archive to indicate file locations and hostnames that will be present when the software images are run as containers on a cluster.

In some implementations, the method includes generating initialization scripts for the software images, the initialization scripts being configured to receive configuration information from environment variables and start containers based on the software images.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

In some implementations, a computing system provides a server environment by running multiple software modules as containers that communicate with each other to respond to provide services to clients. For example, software modules for different functions, applications, and/or services within the server environment may be executed as different containers, which can operate separately and independently of each other. One or more of the containers may provide front-end interfaces for client devices to interact with the server environment. One or more of the containers may provide back-end functions such as query processing, natural language processing, access control, authentication, database processing, and so on. The containers in the cluster may be able to communicate with certain other containers within the cluster to fulfill user requests. For example, the arrangement may limit which containers may communicate with each other, as well as the nature of the communications, for example, using application programming interfaces (APIs) to specify the types of interactions permitted.

A container-based server environment can provide various advantages in managing and upgrading the server environment. For example, containers can be dynamically started and stopped to balance load and manage resource usage. If one container experiences a high volume of traffic, another container for the same function can be started to help share the traffic. As another example, the use of containers can improve reliability. If one of the containers is terminated, crashes, or otherwise ends, other containers continue running and are unaffected. The system can create a new container with an instance of the same software as the container that was terminated. The system can track and store state data about containers, so that the operating state of a container can be recreated later. As another example, the use of containers can facilitate upgrades to portions of the server system with little or no downtime. While the server environment runs a first container with one version of a software module, the system can start running a second container with an upgraded version of the software module. With the first container and second container running in parallel, the system can A container-based server environment can be configured to carry out various analytics functions. For example, a container-based environment can be used to implement a business intelligence system that performs manages databases and data sets, performs data analysis, generates visualizations of data, and generates reports and other documents. Other business intelligence functions include online analytical processing, analytics, data mining, process mining, complex event processing, business performance management, benchmarking, text mining, predictive analytics, and prescriptive analytics.

Figure 1:
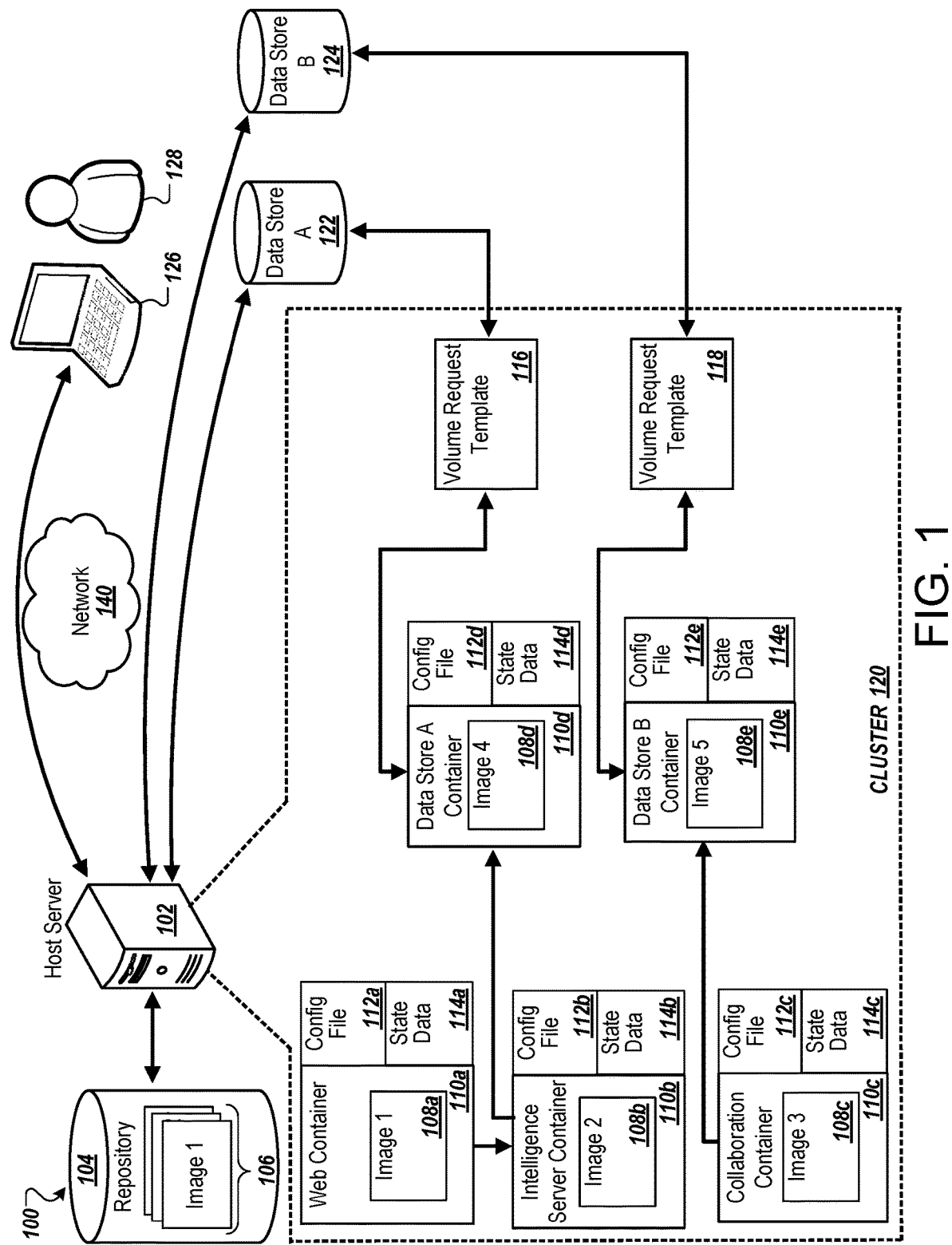
FIG. 1 is a diagram showing an example of a system using a container-based server environment.

FIG. 1 is a diagram showing an example of a system 100 using a container-based server environment. The system 100 includes a host server 102 which runs various containers 110a-110e which each provide a portion of the functionality of a server environment. The containers 110a-110e represent different instances of software images 106 that are available from a repository 104, which may be local or remote with respect to the server 102. The host server 102 may be local, e.g. on-premises, or may be part of a cloud computing service. The host server 102 can provide a cluster 120 of processing nodes that execute the respective containers 110a-110e. As discussed further below, the containers 110a-110e represent instances of applications and/or services that together represent a server environment. For example, the server environment can provide analytics services (e.g., querying, reporting, database access, OLAP, etc.) to various client devices.

In order to manage the containers 110a-110e, the system 100 may leverage one or more container engines or technologies such as, for example, Docker and/or CoreOS rkt. In order to arrange the containers to perform a variety of different server functions, the system 100 may leverage one or more container orchestration engines (COEs) such as, for example, Kubernetes, Mesos, and/or Docker Swarm. These technologies can automate various functions such as creating new containers, initializing or restoring state of the containers, starting execution of containers, monitoring containers, stopping execution of containers, and removing stopped containers from the server environment.

The system 100 includes the host server 102, the repository 104, and an administrator device 126 accessible by an administrator 126. In the illustrated example, the system 100 includes a first data store 122 ("Data Store A") and a second data store 124 ("Data Store B"). The administrator device 126 may communicate with the host server 102 over, for example, the network 140. The host server 102 may communicate with the first data store 122 and the second data store 124 over, for example, the network 140. The host server 102 may communicate with the repository 104 over, for example, the network 140.

The administrator device 126 can be an electronic device such as a computing device. The administrator device 126 can be, for example, a desktop computer, a laptop computer, a smart phone, a cell phone, a tablet, a PDA, etc. The administrator device 126 may be a client device. The administrator device 126 is accessible by a administrator 128, e.g., a software developer, an operator, etc.

The host server 102 is a server system and can include one or more computing devices. In some implementations, the host server 102 is located on the premises of a customer, e.g., on-premises. In other implementations, the host server 102 is not located on the premise of a customer, e.g. off-premise. In these implementations, the host server 102 may be part of a cloud provider, e.g., a third-party server system, such as, for example, Amazon Web Services (AWS), Microsoft Azure, or Google Cloud Platform (GCP). In some implementations, the host server 102 and the administrator device 126 are part of single computer system.

The repository 104 is a data storage containing a collection of images 106. The collection of images 106 being a collection of software images. The collection of images 106 may include various images for differing applications and functions, and/or various images of different versions of the same application or function. In some implementations, the repository 104 is located on the premises of a customer, e.g., on-premises. In other implementations, the repository 104 is not located on the premise of a customer, e.g. off-premise. In these implementations, the repository 104 may be part of a cloud provider, e.g., a third-party server system, such as, for example, Docker Hub, Amazon Web Services (AWS), Microsoft Azure, or Google Cloud Platform (GCP).

The network 140 can include public and/or private networks and can include the Internet.

In general, a software image, such as those included in the collection of images 106, may refer to a snapshot, or template, from which new containers can be started. The software image can be a serialized copy of the entire state of an application or service stored in a non-volatile form, such as one or more files. Software images for containers of container-based environments generally exclude the operating system, but include the application or service, as well as supporting code libraries, dependencies, data sets, and so on that allow the application or service to run on an operating system of a host. The elements of the software image can be configured in a particular state. This package, the software image, is then executable as a container on the operating system of a host system, e.g., a cluster of processing nodes.

In serving as a snapshot or template, a single software image can be used to deploy multiple containers, with each container running a different instance of the same software image. A software image may include all of the components necessary for running a container, e.g., running an independent instance of the application or service for which the software is stored in the software image. These various components may include, for example, dependencies such as libraries and/or tools, code, a configuration file, one or more drivers, and/or settings. The software image may also contain references, pointers, or links to objects such as files outside of the software image and/or the corresponding container. Software images often define an internal file system structure, e.g., with various files organized in folders or directories, so that components of the software image can reference and access each other in a predictable manner. A software image may be composed of a set of read-only layers. A software image may be modified, for example, by adding a new layer to the set of read-only layers. A software image may be associated with a particular application or function. Similarly, the components of a software image may be associated with a particular application or function.

In general, a container may refer to an encapsulated environment in which applications or functions, e.g., services, are run. A container is defined by a software image and by a configuration file. A container is an instance of a software image and has access to the components of the software image. Using containers, the system 100 can run multiple instances of the same software image within different containers.

In general, a cluster represents a set of processing nodes. The processing nodes may each represent physical hardware, such as processors, processor cores, or computers. The processing nodes may additionally or alternatively represent virtualized processing nodes, such as virtual CPUs that represent processing capabilities of a hardware platform but may not be mapped directly to specific hardware processors. Individual containers or groups of containers may be assigned to be run using specific processing nodes or groups of processing nodes. In some implementations, each container is assigned to and run by a different processing node in the cluster. In some implementations, multiple containers are grouped together to be executed by one or more processing nodes of the cluster. For example, a grouping such as a Kubernetes pod may include multiple containers that execute using the same processing node(s).

The techniques disclosed in this document can be used to more conveniently provide server functions. For example, a container-based or "containerized" server environment as shown in FIG. 1 can variety of different server functions without requiring separate servers such as a database server, a document library server, a web server, and a collaboration server. This can greatly streamline the management and maintenance of the server environment, while still providing the same or even more functionality than implementations with stand-alone servers. A container-based server environment also enables centralized management that simplifies the launch and updating of applications and functions.

The techniques disclosed in this document can be used to more efficiently provide server functions. Containers generally utilize fewer resources and less disk space than virtual machines. As a result, compared to stand-alone servers and virtualized servers, a container-based server environment can often provide equivalent performance with fewer hardware resources, or provide greater throughput and capacity using the same level of hardware resources.

Although virtual machines and containers both run on host machines, there are significant differences between them. Typically, a virtual machine is an instance of a distinct computer system including an operating system and any number of installed applications. The virtual machine uses emulation software that runs on a host system, usually a real hardware system although it can also be a virtual one. This is made possible either full virtualization or hardware-assisted virtualization, both providing the emulation layer required to run a guest operating system in full isolation. A typical virtual provides complete isolation in terms of having its own processes, networking, users, etc., which are separate from the host system and other guest systems that may be running alongside it.

Containers are typically instances of software that run on a host machine. Like virtual machines, containers can allow isolated processes, networking, users, etc. However, with containers, a guest operating system is not installed, and the container often includes only the application code needed for a single application. As a result, running the container runs the processes necessary for a particular application or service, without creating the overhead of a guest operating system. Containers can take advantage of the host operating system and layered file system, instead of requiring the emulation layer used to run virtual machines. Because a container doesn't require its own operating system, it uses fewer resources and consumes only the resources required for the application that is run upon starting the container.

In further detail, a virtualized system includes a host operating system and a hypervisor that runs on the host operating system. The hypervisor manages the various virtual machines, providing isolation between the virtual machines and the host operating system. The hypervisor can also provide emulation so each virtual machine can run as if it had direct access to the server hardware. Each virtual machine then includes a guest operating system, its own copy of any libraries or binaries needed, as well as applications run in the virtual machine. Each instance of a virtual machine thus runs its own operating system and its own applications and copies of supporting libraries.

By contrast with the virtualization approach, the container-based approach does not involve a hypervisor or emulation layer. The containers can run on the host operating system and the containers do not include guest operating systems. In some implementations, multiple containers (which may be multiple instances of the same software image) may share certain libraries, binaries, or other resources, which can further improve efficiency.

As shown in FIG. 1, a container-based server environment includes containers 110a-110e running on the cluster 120 of processing nodes provided by the host server 102. Each container 110a-110e has an associated configuration file and state data. Each container runs an instance of a software image, which may be referred to as a container image. The software image includes the executable code for an application or service, as well as dependencies for the application or service. However, the software image for a container does not include an operating system. One or more of the software images 108a-108e within the containers 110a-110e respectively may have been stored in and obtained from the repository 104.

The containers may include containers developed or provided by different parties. For example, containers 110a-110c may be provided by one organization, and containers 110d and 110e may be provided by a different organization. As will be described in more detail with respect to FIG. 2, the variety of containers may include containers for applications and/or functions related to business intelligence (BI). These BI containers may include, for example, a web interface container 110a, an intelligence server container 110b, and a collaboration container 110c. The third-party containers include a data store A container 110d and a data store B container 110e.

The third-party containers 110d and 110e may run third-party applications or functions. These applications or functions may include, for example, applications or functioned related to database management, document databases, distributed streaming platforms, key-value stores or data structure stores, etc. These third-party containers may have one or more corresponding data stores or databases. Here, the container 110d corresponds with a first data store 122 ("Data Store A"), and the container 110e corresponds with a second data store 124 ("Data Store B"). The container 110d is able to communicate with the first data store 122 through a first volume request template 116 in order to, for example, retrieve data from the data store 122 or to push data to the data store 122. The container 110e is able to communicate with the second data store 124 through a second volume request template 118 in order to, for example, pull data from the data store 124 or to push data to the data store 124. The volume request templates 116 and 118 may allow for volume requests to automatically be generated. The volume request templates 116 and 118 may provide templates for volume plugin requests. The volume request template 116 and/or the volume request template 118 may be a volume plugin template. The volume request template 116 and/or the volume request template 118 may be a persistent claim volume template.

Each of the containers 110a-110e may have a corresponding configuration file 112a-112e. When each container 110a-110e is created and initialized, the host server 102 accesses the appropriate configuration file 112a-112e to prepare the container. For example, a configuration file 112a-112e may be a script that the host server 102 runs to modify or configure a software image when the software image is first loaded as a new container. The configuration file may cause the software image to be altered or updated, and/or may specify parameters to be used in operating a container using the software image (e.g., hardware resources needed, network port assignments, etc.). Processing the configuration file for a software image may insert data such as values for settings into the container that is an instance of the software image. The configuration files 112a-112e may be stored in the repository 104 with the software images 106.

The configuration files 112a-112e may include various parameters, such as cache sizes, capacity limits, port assignments, etc. Accordingly, the configuration files 112a-112e may facilitate the deployment of the containers 110a-110e. The administrator 128 can be provided access to create or modify the configuration files 112a-112e through the administrator device 126. In some implementations, configuration files 112a-112e are embedded in a software image.

The images 108a-108e represent software images that an administrator selected from the collection of software images 106 in the repository 104 to be run as containers on the cluster 120.

Figure 4:
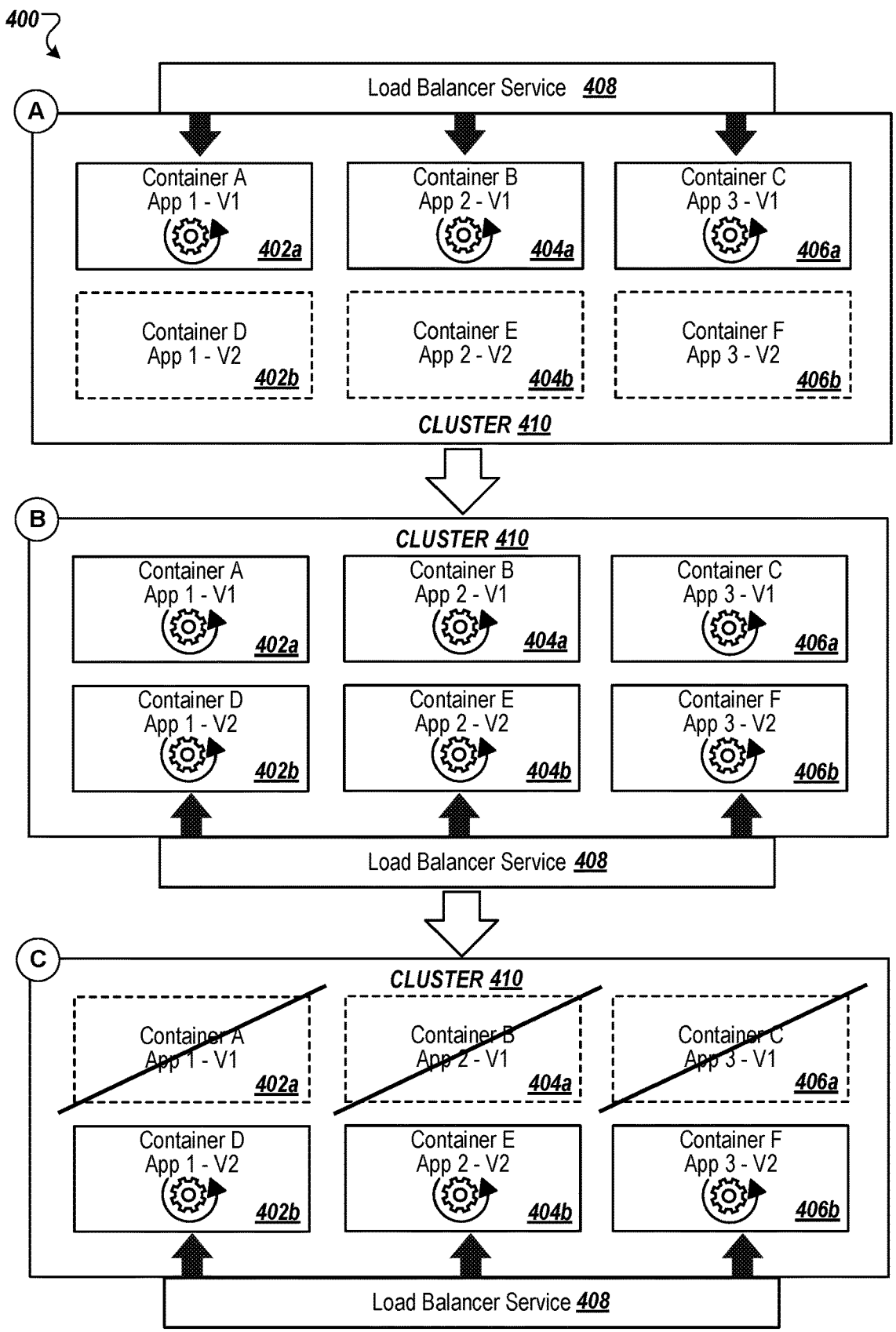
FIG. 4 is a diagram illustrating an example process for updating software in a container-based server environment.

The administrator 128, through the administrator device 126, may modify the images 108a-108e from time to time, for example, to upgrade the applications and services provided by the software images 108a-108e. FIG. 4 shows an example how updated images can be loaded and used in a server environment without disrupting open sessions and operations in progress.

Each of containers 110a-110e has a corresponding set of state data 114a-114e. The state data 114a-114e represents the current state of each container 110a-110e, may include, for example, session-based state data. In some implementations, the state data 114a-114e includes data in addition to session-based state data such as, for example, environment-based state data. If one or more of the containers 110a-110e were to crash or otherwise end, they could effectively be redeployed and brought back to their previous state by the system 100 leveraging the respective state data 114a-114e. For example, if the web interface container 110a were to crash, the session-based state data from the previous session would be stored in the state data 114*a*. In this example, upon the redeployment of a web interface container having the first image 108*a* and having the configuration file 112*a* mounted to it, the state data 114*a* could be read into the redeployed container in order to return the redeployed container to the previous state of the web interface container 110*a*.

As shown, the server environment includes the web interface container 110*a*, the intelligence server container 110*b*, the collaboration container 110*c*, the data to the data store A container 110*d*, the data store B container 110*e*, the configuration files 112*a*-112*e*, the state data 114*a*-114*e*, and the volume request templates 116 and 118. The server environment may include other components that are not shown, such as additional containers, configuration files containing deployment instructions for the server environment, etc.

The web interface container 110*a* includes a first image 108*a*. The web interface container 110*a* corresponds with the configuration file 112*a* and the state data 114*a*. During the deployment of the server environment, data from the web interface container 110*a* may be added to the state data 114*a*. The web interface container 110*a* may be able to send data to the intelligence server container 110*b*.

The intelligence server container 110*b* corresponds with the configuration file 112*b* and the state data 114*b*. During the deployment of the server environment, data from the intelligence server container 110*b* may be added to the state data 114*b*. The intelligence server container 110*b* may be able to send data to the data store A container 110*d*.

The collaboration container 110*c* corresponds with the configuration file 112*c* and the state data 114*c*. During the deployment of the server environment, data from the collaboration container 110*c* may be added to the state data 114*c*. The collaboration container 110*c* may be able to send data to the data store B container 110*e*.

The data store A container 110*d* corresponds with the configuration file 112*d* and the state data 114*d*. During the deployment of the server environment, data from the data to the data store A container 110*d* may be added to the state data 114*d*. The data store A container 110*d* may be able to send data and receive data from the data store 122 by using the volume request template 116.

The data store B container 110*e* corresponds with the configuration file 112*e* and the state data 114*e*. During the deployment of the server environment, data from the data to the data store B container 110*e* may be added to the state data 114*e*. The data store B container 110*e* may be able to send data and receive data from the data store 124 by using the volume request template 118.

Figure 2:
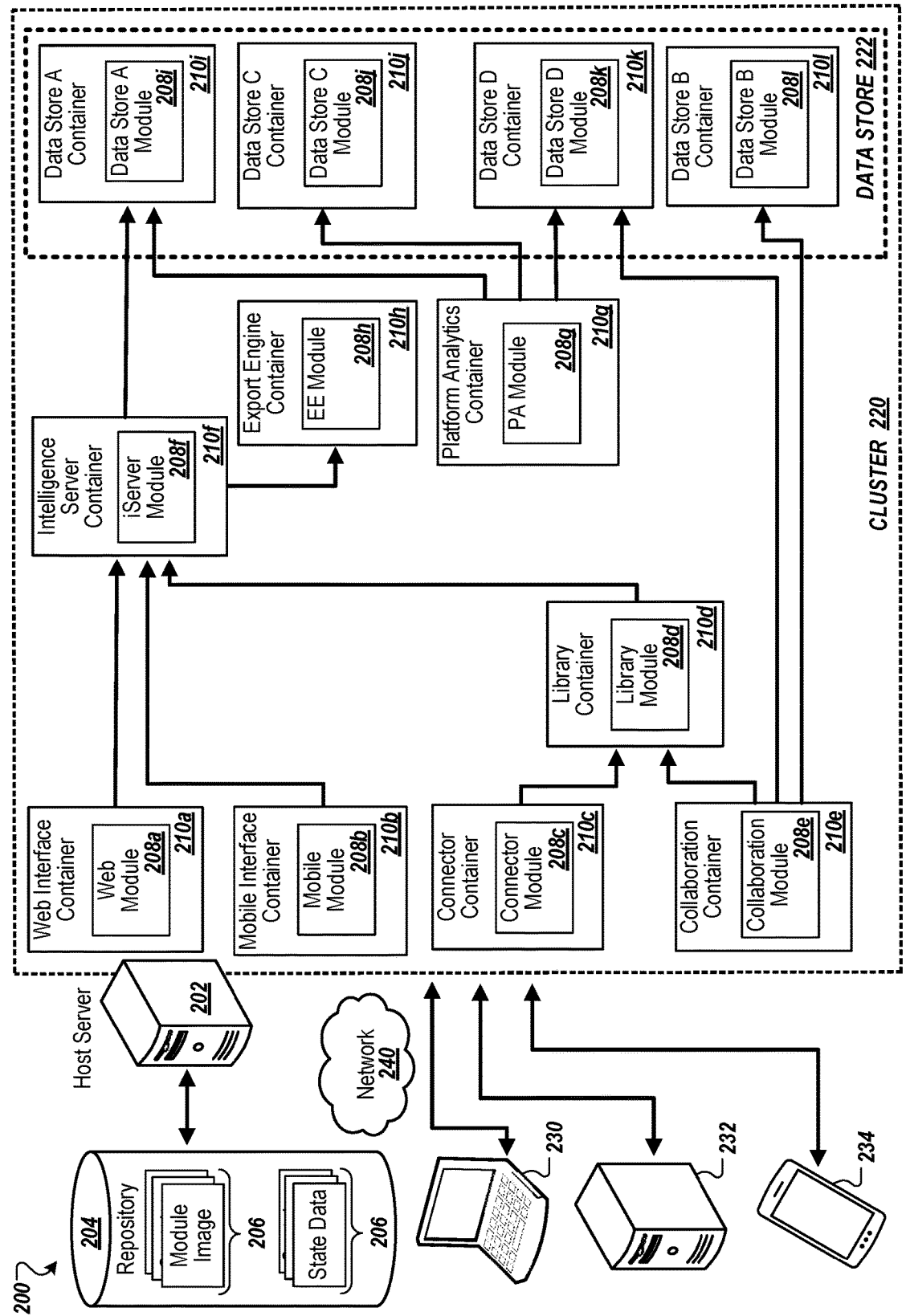
FIG. 2 is another diagram showing an example of a system using a container-based server environment.

FIG. 2 is a diagram showing an example of a system 200 using a container-based server environment. Through the system 200, various containers represent instances of software images running on a host server 202. The host server 202 may access the software images stored on a local or remote repository 204. The host server 202 may be local, e.g. on-premises, or may be part of a cloud computing service. The containers may be used to perform a variety of different server functions.

In order to generate and deploy the containers, the system 200 may leverage one or more container engines or technologies such as, for example, Docker and/or CoreOS rkt. In order to arrange the containers to perform a variety of different server functions, the system 200 may leverage one or more container orchestration engines (COEs) such as, for example, Kubernetes, Mesos, and/or Docker Swarm.

In some implementations, the system 200 is the system 100 as shown in FIG. 1.

The system 200 includes the host server 202 and the repository 204. The system 200 may further include or communicate with a client device 230, a client device 232, and a mobile client device 234. The client devices 230-34 may communicate with the host server 202 over, for example, the network 240.

The client devices 230, 231, 232 can each represent an electronic device such as a laptop computer, a desktop computer, a mobile phone, a smart phone, a tablet, a personal digital assistant, or another computing device.

The host server 202 is a server system and can include one or more computing devices. In some implementations, the host server 202 is located on the premises of a customer, e.g., on-premises. In other implementations, the host server 202 is not located on the premise of a customer, e.g., off-premises. In these implementations, the host server 202 may be part of a cloud provider, e.g., a third-party server system, such as, for example, Amazon Web Services (AWS), Microsoft Azure, or Google Cloud Platform (GCP). In some implementations, the host server 202 is the host server 102 described above with respect to FIG. 1.

The repository 204 is a data storage containing a collection of software images 206. The collection of images 206 may include various images for differing applications and functions, and/or various images of different versions of the same application or function. In some implementations, the repository 204 is located on the premises of a customer, e.g. on-premises. In other implementations, the repository 204 is not located on the premise of a customer, e.g. off-premise. In these implementations, the repository 204 may be part of a cloud provider, e.g., a third-party server system, such as, for example, Docker Hub, Amazon Web Services (AWS), Microsoft Azure, or Google Cloud Platform (GCP). In some implementations, the repository 204 is the repository 104 described above with respect to FIG. 1. In these implementations, the collection of images 206 may be the collection of images 106 described above with respect to FIG. 1.

The network 240 can include public and/or private networks and can include the Internet.

The server environment may include a variety of containers for various server related applications and/or functions. The server environment may include one or more containers for performing processing for analytics, such as business intelligence analytics. For example, as shown the server environment includes the containers 201*a*-210*l* where the containers 210*a*-210*g* may relate to server analytics. The server environment may include third-party containers. These third-party containers may include containers that are configured to send data to, receive data from, and/or communicate with external data stores and/or databases. Similarly, the third-party containers may be instances of software images developed and/or provided by third parties. These containers 210*i*-210*l* can be third-party containers.

The server environment may include various components not shown. For example, the server environment may include various configuration files for the containers 210*a*-210*l*, various state data for each of the containers 210*a*-210*l*, volume request templates for the data store 222 containers 210*i*-210*l* to allow the containers 210*i*-210*l* to communicate with external data stores or databases, a configuration file for the server environment, other containers, etc.

The client devices 230-234 may be able to interact with the server environment through front-end interface services or functions of the server environment. As will be described in more detail below, these front-end interface services or functions may include, for example, the web interface container 210a, the mobile interface container 210b, and the library container 210d. Other containers in the server environment may be back-end containers. These back-end containers may include, for example, the intelligence server container 210f, the export engine container 210h, and the data store containers 210i-210l.

The web interface container 210a includes a web module image 208a. The web module image 208a may be stored in and obtained from the collection of images 206 of the repository 204. The web interface container 210a may provide a front-end interface that can interact with the client devices 230-232. Users of one or more of the client devices 230-232 may be able to use the web interface container 210a for analytics and/or BI. For example, users of one or more of the client devices 230-232 may be able to use the web interface container 210a for BI reporting, analysis, and/or monitoring. For example, the web interface container 210a may provide users of the client devices 230-232 a single, unified web interface in which to perform the major styles of BI such as, for example, scorecards and dashboards, enterprise reporting, online analytical processing (OLAP) analysis, predictive analysis, and alerts and proactive notification. The web interface container 210a may allow users to move seamlessly between the various styles of BI and to combine multiple styles in a single report display.

The web interface container 210a can provide data to the intelligence server container 210f.

In some implementations, the web interface container 210a is the web interface container 110a as shown in FIG. 1.

The mobile interface container 210b includes a mobile module image 208b. The mobile module image 208b may be stored in and obtained from the collection of images 206 of the repository 204. The mobile interface container 210b may provide a front-end interface that can interact with the mobile client device 234. Users of the mobile client device 234 may be able to use the mobile interface container 210b for analytics and/or BI. For example, users of one or more of the mobile client device 234 may be able to use the mobile interface container 210b for BI reporting and analysis. The mobile interface container 210b may recognize touch and smart gestures placed by users through the mobile client device 234.

The mobile interface container 210b can provide data to the intelligence server container 210f.

The connector container 210c includes a connector module image 208c. The connector module image 208c may be stored in and obtained from the collection of images 206 of the repository 204. The connector container 210c may allow for the importation of data into the server environment from various data sources. For example, users of the client devices 230-232 may be able to use the connector container 210c to import data into the server environment from various data sources.

The connector container 210c can provide data to the library container 210d.

The library container 210d includes a library module image 208d. The library module image 208d may be stored in and obtained from the collection of images 206 of the repository 204. The library container 210d may provide a front-end interface that can interact with the client devices 230-234. Users of one or more of the client devices 230-234 may be able to use the library container 210d for analytics and/or BI. For example, users of one or more of the client devices 230-234 may be able to use the library container 210d for BI reporting and analysis. As an example, the library container 210d may provide users of the client devices 230-234 an interface to view, analyze, and consume various reports and documents.

The library container 210d can provide data to the intelligence server container 210f.

The collaboration container 210e includes a collaboration module image 208e. The collaboration module image 208e may be stored in and obtained from the collection of images 206 of the repository 204. The collaboration container 210e may allow users of the client devices 230-234 to access shared content, to search through documents or reports, to share content, to interact with other users, to monitor other users, to monitor other users' actions, etc.

The collaboration container 210e can provide data to the library container 210d, to the data store D container 210k in the, and to the data store B container 210l.

The intelligence server container 210f includes an intelligence server ("iServer") module image 208f. The intelligence server module image 208f may be stored in and obtained from the collection of images 206 of the repository 204. The intelligence server container 210f may provide an analytics and/or BI platform. The intelligence server container 210f may provide an analytics and/or BI platform that can be used by other applications or functions such as the applications and/or functions deployed in one or more of the other containers 210a-210e, and 210g-210l. For example, the intelligence server container 210f may provide an integrated platform for BI monitoring, reporting, and analysis.

The intelligence server container 210f can provide data to the export engine container 210h, and to the data store A container 210i.

In some implementations, the intelligence server container 210f is the intelligence server container 110b as shown in FIG. 1.

The platform analytics container 210g includes a platform analytics ("PA") module image 208g. The platform analytics module image 208g may be stored in and obtained from the collection of images 206 of the repository 204. The platform analytics container 210g may provide monitoring capabilities. For example, the platform analytics container 210g may provide a monitoring tool to collect platform data, e.g. telemetry.

The platform analytics container 210g may allow for the collection of data from various server environments, users, e.g. users of the client devices 230-234, data cubes, etc.

The platform analytics container 210g can provide data to the data store A container 210i, the data store C container 210j, and the data store D container 210k.

The export engine container 210h includes a new export engine ("NEE") module image 208h. The export engine module image 208h may be stored in and obtained from the collection of images 206 of the repository 204. The export engine container 210h may provide a conversion function. This conversion function may be used, for example, by the intelligence server container 210f. For example, the intelligence server container 210f may use the export engine container 210h to convert various documents, reports, and dashboards into particular file types or formats. As an example, the intelligence server container 210f may use the export engine container 210h to create PDF files from various documents, reports, and dashboards.

The data store A container 210i includes a data store A module image 208i. The data store A module image 208i may be stored in and obtained from the collection of images 206 of the repository 204. The data store A container 210i may provide an application or function associated with an external data store or database. For example, the data store A container 210*i* may provide an application or function associated with the data store 122 shown in FIG. 1.

In some implementations, the data store A container 210*i* is the data store A container 110*d* as shown in FIG. 1.

The data store B container 210*l* includes a data store B module image 208*l*. The data store B module image 208*l* may be stored in and obtained from the collection of images 206 of the repository 204. The data store B container 210*l* may provide an application or function associated with an external data store or database. For example, the data store B container 210*l* may provide an application or function associated with the data store 124 shown in FIG. 1.

In some implementations, the data store B container 210*l* is the data store B container 110*e* as shown in FIG. 1.

The data store C container 210*j* includes a data store C module image 208*j*. The data store C module image 208*j* may be stored in and obtained from the collection of images 206 of the repository 204. The data store C container 210*j* may provide an application or function associated with an external data store or database.

The data store D container 210*k* includes a data store D module image 208*k*. The data store D module image 208*k* may be stored in and obtained from the collection of images 206 of the repository 204. The data store D container 210*k* may provide an application or function associated with an external data store or database.

Figure 3:
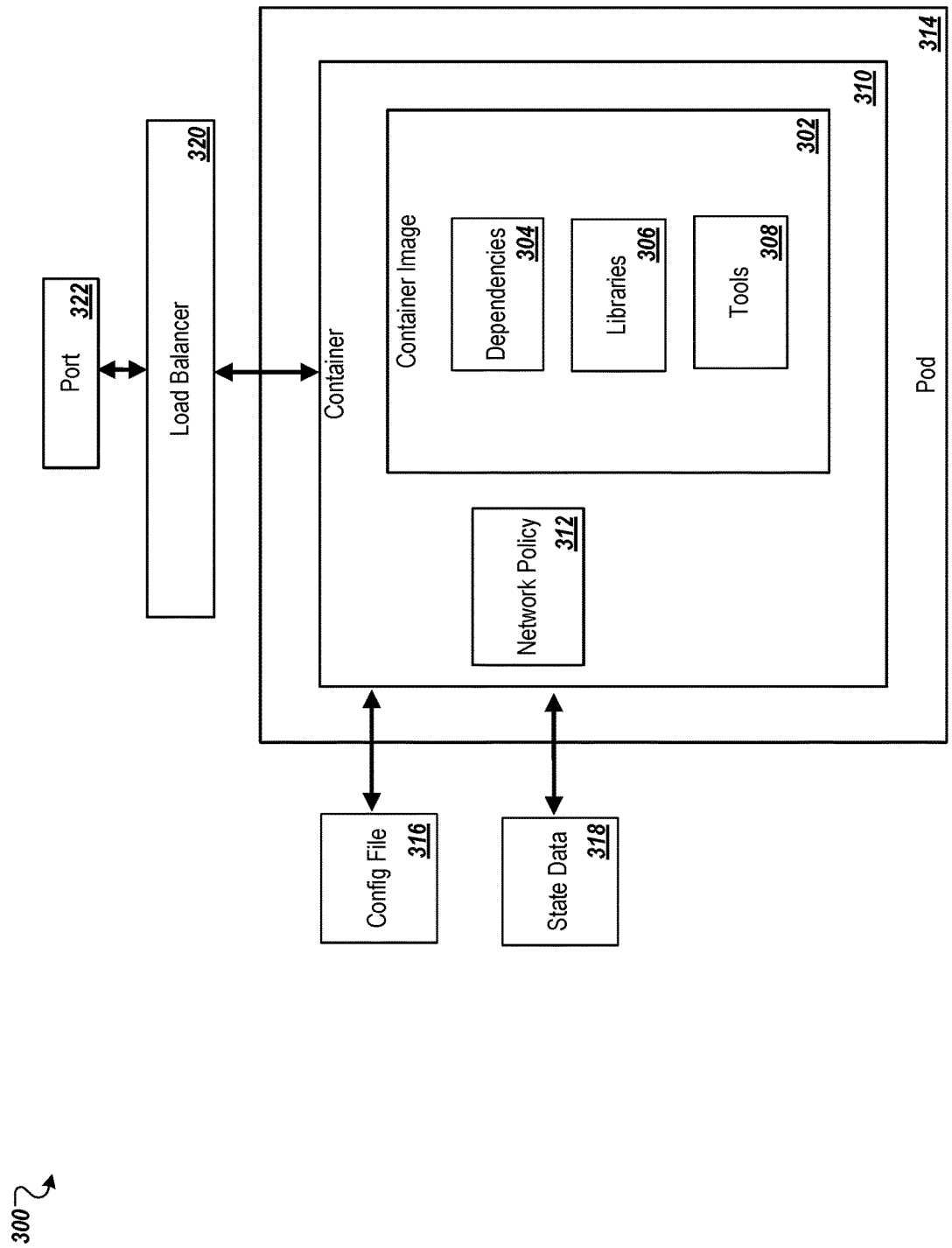
FIG. 3 is a diagram illustrating an example of a container and associated data.

FIG. 3 is a diagram illustrating an example container architecture 300. As shown, the architecture includes a container 310 in a pod 314, a configuration file 316, state data 318, a load balancer 320 used to balance the load or traffic over one or more containers including the container 310, and a port 322 in order to allow communication between the container 310 and other containers, external applications or functions, or users. Each of the containers 110*a*-110*e* and 210*a*-210*l* can be implemented using some or all of the features of the container architecture 300.

A pod, such as the pod 314, may be a management component that is used by a container management platform to organize and/or deploy one or more containers.

The container 310 includes a software image 302. The container 310 is running an instance of the software image 302. The software image 302 is associated with a specific application or function such as, for example, a server service. Accordingly, the container 310, when deployed, is running the specific application or function associated with the software image 302.

The software image 302 may include a variety of components. These variety of components may be components corresponding to the specific application or function associated with the software image 302. These variety of components may include dependencies 304, libraries 306, and/or tools 308. The dependencies 304 may include dependencies need by the specific application or function associated with the software image 302. The dependencies 304 may include specific versions of programming language runtimes and other software libraries. In some implementations, the dependencies 304 include the libraries 306. In some implementations, the dependencies 304 include the tools 308. The libraries 306 may include system libraries and/or system settings. The tools 308 may include system tools. The software image 302 may also include code for the specific application or function associated with the software image 302.

However, neither the software image 302 nor the container 310 that represents the instantiation of the software image 302 includes an operating system (OS). Instead the container 310 may run on the operating system of the underlying system such as, for example, the operating system of the host server 102 shown in FIG. 1 or the host server 202 shown in FIG. 2.

The container 310 also includes a network policy 312. The network policy 312 may specify how the container 310 and/or pod 314 is allowed to communicate with other containers, pods, and/or other network endpoints. For example, the network policy 312 may make the application or function of the container 310 only accessible from in the pod 314 and/or the container 310 itself. As another example, the network policy 312 may expose the application or function of the container 310 to only other containers, e.g. other containers in the same cluster, or only to specific other containers, e.g. specific other containers in the same cluster. As another example, the network policy 312 may make the application or function of the container 310 accessible from anywhere, e.g., the container 310 is made accessible outside of its associated cluster. In some implementations, the network policy 312 is located outside of the container 310 but in the pod 314.

The configuration file 316 may be read into the container 310. Accordingly, the configuration file 316 may be mounted to the containers 310. The configuration file 316 may include various parameters, may include an indication of the software image 302, may include instructions to pull the software image 302 from a collection of images stored on a repository, etc. The parameters in the configuration file 316 may include, for example, a cache size, capacity limits, port assignments, etc. The configuration file 316 may be used to effectuate the deployment of the container 310. The configuration file 316 may have been generated or modified by an operator, developer, or administrator of the container 310 or of a cluster that the container 310 is part of.

In some implementations, the configuration file 316 is embedded in the container 310 by, for example, an operator, developer, or administrator of the container 310 or of a cluster that the container 310 is part of.

In some implementations, the configuration file 316 is embedded in the software image 302 by, for example, an operator, developer, or administrator of the container 310 or of a cluster that the container 310 is part of prior to the instance of the container being run in a container.

The state data 318 may include, for example, session-based state data. Data from the container 310 may be added to the state data 318 during the deployment of the container 310. In some implementations, the state data 318 includes data in addition to session-based state data such as, for example, environment-based state data. If the container 310 were to crash or otherwise end, a system, e.g. the system 100 as shown in FIG. 1, could effectively redeploy the container 310 by deploying a new instance of the software image 302 and leveraging the state data 318 to bring the redeployed container to the previous state of the container 310.

FIG. 4 is a diagram illustrating an example process 400 for deploying new container instances. This can include transitioning from that is seamless, e.g., without downtime or unavailability, to client devices and other containers of the environment.

FIG. 4 also illustrates various events, shown as stages (A) to (C), with each representing a step in an example process for deploying new container instances. Stages (A) to (C) may occur in the illustrated sequence, or in a sequence that is different from the illustrated sequence. For example, some of the stages may occur concurrently.

The system, such as the system 100 shown in FIG. 1, may be able to deploy new container instances of corresponding applications without immediately replacing or ending existing container instances of those same corresponding applications such that the new container instances and the existing container instances can run in parallel. The system 100 may deploy these new container instances in the same container-based server environment, such as the same cluster, where the existing container instances have already been deployed. Although the existing container instances are not immediately replaced by the new container instances or immediately ended as a result of initiating the process for deploying the new container instances, the new container instances of the corresponding applications are meant to eventually replace the existing container instances of those same corresponding applications.

The system 100 shown in FIG. 1 may initiate the process of deploying the new container instances to replace the existing container instances for various reasons. For example, the system 100 may initiate the process of deploying a new container instance of a corresponding application due to the new container instances having an updated or different software image. The updated or different software image may represent a new version of the corresponding application. The updated or different software image may include new or modified dependencies, libraries, tools, settings, etc.

During the process of deploying the new container instances, while preparing the new container instances, the system 100 shown in FIG. 1—e.g. through load balancer services 408—may continue to provide requests to the existing container instances in a manner that is substantially equivalent to request allocation prior to the start of this deployment process. Similarly, during the process of deploying the new container instances, while the system 100 prepares the new container instances, the existing container instances may continue to process any received or previously received requests in a manner that is substantially equivalent to request processing prior to the start of this deployment process.

Once a new container instance of a particular application has been deployed, the system 100 shown in FIG. 1—e.g. through the load balancer services 408—may begin sending requests that would have been provided to the existing container instance of that application to the new container instance of that application. However, in some implementations, the system 100—e.g. through the load balancer services 408—may provide the new container instance of that particular application with only a portion of the requests that would have been provided to the existing container instance of that application due to, for example, differences between the new container instance and the existing container instance (e.g., the new and existing container instances using different software images, each corresponding with a different software version of the same application). Similarly, in some implementations, the system 100—e.g. through the load balancer services 408—may provide the new container instance of that particular application with one or more requests that would not have been provided to the existing container instance of that application due to, for example, differences between the new container instance and the existing container instance (e.g., the new and existing container instances using different software images, each corresponding with a different software version of the same application). When the new container instances begin receiving requests, they may start processing those requests.

Once a new container instance of a particular application has been deployed, the system 100 shown in FIG. 1—e.g. through the load balancer services 408—may stop providing requests to the existing container instance of that application. However, the system 100 might not immediately end the existing container instance once the new container instance of the same application has been deployed. For example, if the existing container instance still includes a queue of received requests, the existing container may continue to exist while it continues to process those requests.

After an existing container instance of a particular application has finished processing all of its previously received requests, the system 100 shown in FIG. 1 may determine that the existing application has finished process its requests and proceed to end the existing container instance of that application. In ending the existing container instance of that application, the system 100 has completed the deployment process of the new container instance of that same application.

In stage (A), existing containers 402a, 404a, and 406a are processing requests and new containers 402b, 404b, and 406b are being prepared in order to be deployed. The existing containers 402a, 404a, and 406a are processing requests provided to them through the load balancer services 408. The load balancing services 408 may include one or more load balancers. Using a load balancer may improve individual container performance and performance of the cluster 410 by spreading the load, e.g. request traffic, over the containers in the cluster 410. Processing requests may involve, for example, processing data, loading data, sending data, etc.

The container 402a is a container for a first application ("App 1"). The container 402a may be running an instance of a software image for a first version ("V1") of App 1. The container 404a is a container for a second application ("App 2"). The container 404a may be running an instance of a software image for a first version ("V1") of App 2. The container 406a is a container for a third application ("App 3"). The container 404a may be running an instance of a software image for a first version ("V1") of App 3.

The container 402b being prepared is another container for App 1. The container 402b may be configured to run an instance of a software image for a second version ("V2") of App 1. The second version may correspond with an upgraded software image or otherwise modified software image for App 1. The second version may correspond with a new software image for App 1.

The container 404b being prepared is another container for App 2. The container 404b may be configured to run an instance of a software image for a second version ("V2") of App 2. The second version may correspond with an upgraded software image or otherwise modified software image for App 2. The second version may correspond with a new software image for App 2.

The container 406b being prepared is another container for App 3. The container 406b may be configured to run an instance of a software image for a second version ("V2") of App 3. The second version may correspond with an upgraded software image or otherwise modified software image for App 3. The second version may correspond with a new software image for App 3.

In preparing to deploy the new containers 402b, 404b, and 406b, the cluster 410 may pull the upgraded, modified, or new images for App 1, App 2, and App 3, respectively. The cluster 410 may pull the images from, for example, a software image repository such as the repository 104 shown in FIG. 1 or the repository 204 shown in FIG. 2.

The cluster 410 may start preparing the new containers 402b, 404b, and 406b in response to receiving instructions from, for example, an operator, developer, or administer of the cluster 410. The cluster 410 may start preparing the new containers 402b, 404b, and 406b in response to receiving upgraded, modified, or new images for App 1, App 2, and App 3 from, for example, an operator, developer, or administer of the cluster 410. The cluster 410 may start preparing the new containers 402b, 404b, and 406b in response to a triggering event, such as detecting that upgraded, modified, or new images for App 1, App 2, and App 3 are available.

In stage (B), the containers 402b, 404b, and 406b are deployed and the load balancer service 408 starts feeding requests to the containers 402b, 404b, and 406b for processing. The requests sent to the containers 402b, 404b, and 406b may correspond with requests that may have been sent to the containers 402a, 404a, and 406a, respectively. For example, the container 402b may receive requests from the load balancer service 408 that would have been sent to the container 402a. As another example, the container 404b may receive requests from the load balancer service 408 that would have been sent to the container 404a. As another example, the container 406b may receive requests from the load balancer service 408 that would have been sent to the container 406b.

In stage (B), the containers 402a, 404a, and 406a continue to process requests that they had previously received from the load balancer service 408. However, the containers 402a, 404a, and 406a stop receiving new requests from the load balancer service 408.

In stage (C), the containers 402a, 404a, and 406a finish processing their respective requests and are terminated. The cluster 410 may end each of the containers 402a, 404a, and 406a upon determining that the containers 402a, 404a, and 406a have finished processing their requests respectively. For example, once the container 402a finishes processing previously received requests, the cluster 410 terminates the container 402a. As another example, once the container 404a finishes processing previously received requests, the cluster 410 terminates the container 404a. As another example, once the container 406a finishes processing previously received requests, the cluster 410 terminates the container 406a.

The containers 402b, 404b, and 406b, which remain active, continue processing requests from the load balancer service 408. As a result of the process shown in FIG. 4, the applications 1-3 have been upgraded to newer versions without interrupting the availability of the applications, and in a manner that is transparent to end users and other containers. The containers 402b, 404b, and 406b running the updated software images continue to operate within the server environment.

Figure 5:
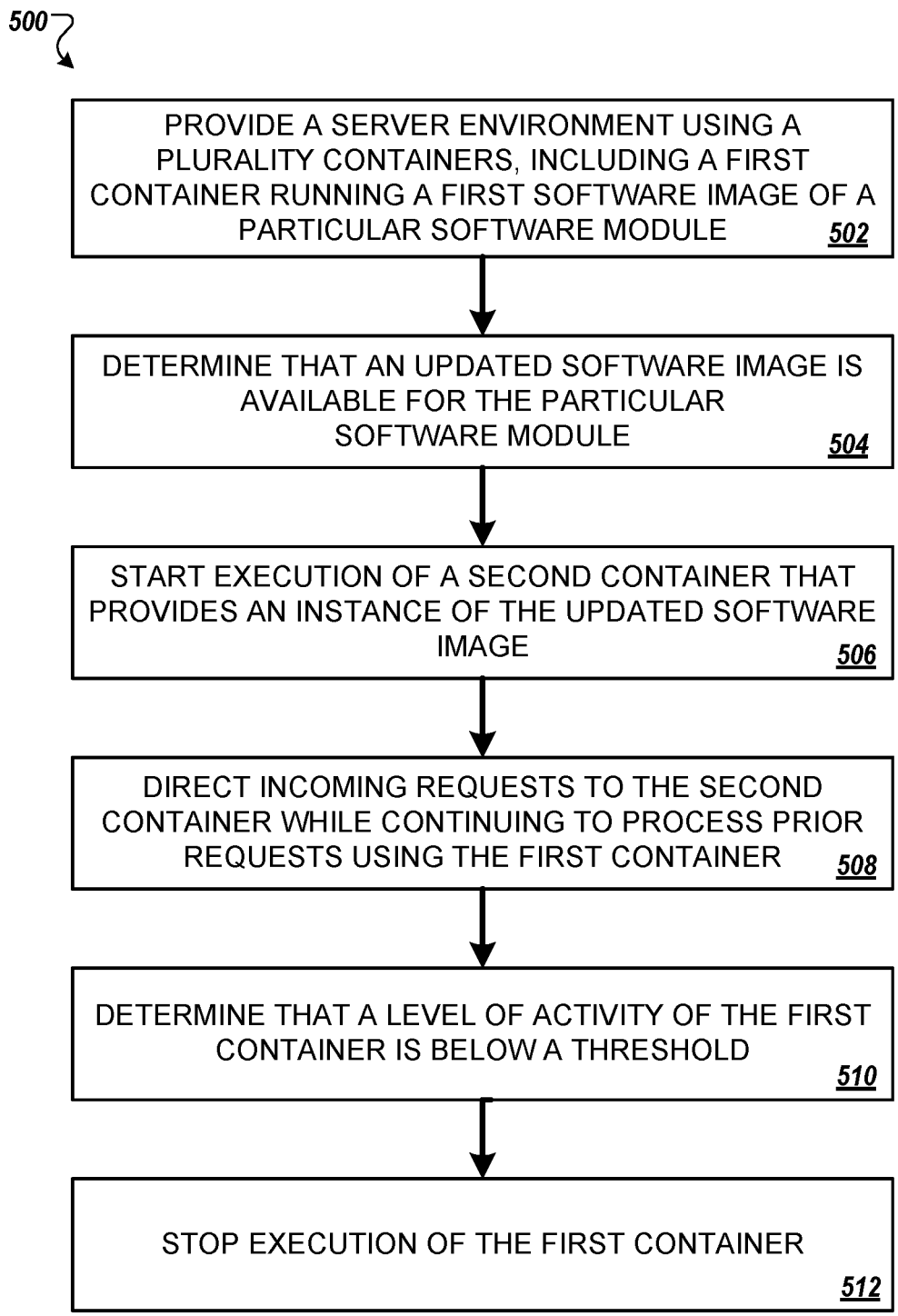
FIG. 5 is a flow diagram showing an example of a process 500 for loading containers in a container-based server environment.

FIG. 5 is a flow diagram showing an example of a process 500 for loading containers in a container-based server environment. The process 500 shows how a container of a container-based server environment may be updated with minimal or no interruption of service provided by the server environment. Briefly, in a server environment running a first container, a new version of the first container (e.g., a version that is patched, is updated, has changed settings, etc.) can be automatically loaded and run in parallel with the first container. After the new version of the container is running, incoming requests are routed to the new container. Meanwhile, earlier requests and tasks in progress at the first container continue to be processed by the first container, in many cases to completion. Once the load at the first container falls below a predetermined level, the first container is stopped and removed from the server environment. This process enables the system to effectively replace a container with the old software image with a container based on a new software image, without any interruption in service.

The system provides a server environment using a plurality of containers that provide instances of different software modules (502). The different software modules are different services or different applications. The plurality of containers can include a first container running a first software image of a particular software module. The containers can be run on a cluster of multiple processing nodes, with resources of the cluster of multiple processing nodes being allocated among the respective containers. The processing nodes may represent actual processors or virtual processing nodes.

The system determines that an updated software image is available for the particular software module (504). This may occur automatically, for example, as triggered by the system based on detecting a new software image, or detecting that a timestamp or version code for a software image has changed. For example, the system may detect that a timestamp or image identifier for a software image in an image repository is newer than the timestamp or identifier for the software image of the first container. Metadata of the image repository may similarly indicated when a new version is made available. The determination may be based on user input, such as user input that selects a software image or otherwise manually initiates an update to a software image for an application. The determination may be based on a message, such as from a software image repository server or other system, indicating that the updated software image is available.

As an example, the system may determine a first version code associated with a software image of the particular software module that is running in the first container. The system may determine a second version code associated with the updated software image in a software image repository. The system may determine that the second version code indicates a more recent version than the first version code. When version codes are incremented or otherwise follow a certain convention to be assigned, the system may use data indicating the convention to detect a newer version (e.g., determining that a version code is higher than the previous version code).

In response to the determining that the updated software image is available, the system performs operations of steps (506) to (512) discussed below. The steps to detect the availability of the updated software image and to create and switch to using the updated software image can be performed automatically by the system. As an alternative, these steps may be manually initiated based on user input, such as when a user selects or creates an updated software image to be used in the server environment.

The system starts execution of a second container that provides an instance of the updated software image (506). For example, the system generates a new container based on the updated software image, allocates resources to the new container, and uses the new container as the second container.

After starting execution of the second container, the system directs incoming requests to the second container (508). The system continues to process, using the first container, one or more requests that were received before starting execution of the second container. As a result, both the first container and the second container, which may both represent different versions of the same application, operate concurrently to process their respective sets of requests. For example, requests to initiate new sessions can be provided to the second container, which will handle the new sessions going forward. Meanwhile, the system continues to provide communications related to existing sessions of the particular software module to the first container. As a result, the first container and the second container, representing instances of different versions of the same application or service, can concurrently process data for their respective sessions which are open concurrently.

The system determines that a level of activity of the first container is below a threshold (510). The system can monitor the load or other activity of the first container, e.g., the number of tasks in progress, a number of tasks in a queue of pending jobs, a number of network connections open, an amount of network traffic, a load level, a resource usage (e.g., CPU utilization, RAM usage, etc.), and so on. For example, the system can determine that the level of activity of the first container is below a threshold because a number of tasks or sessions in progress for the first container is below a threshold. The system may monitor various operational or performance characteristics of the first container to determine the current level of activity, including network traffic, executing processes, network connections, resource utilization, and so on.

In response to determining that the level of activity of the first container is below the threshold, the system stops execution of the first container (512). The system can also remove the first container from the server environment. For example, the system can deallocate resources from the first container and can remove the first container from the server environment, thus reclaiming the memory and other resources that were used by the first container.

In general, starting execution of a second container, directing incoming requests to the second container, and stopping execution of the first container are performed such that the server environment transitions from using the first software image to using the updated software image without causing unavailability of the particular software module and in a manner that is transparent to client devices and/or other containers that make use of the particular software module.

In some implementations, associated with stopping the first container, the system provides notifications to client devices with pending jobs or sessions that their sessions or jobs have been cancelled and should be issued again. In other implementations, the system automatically determines which requests to the first container are unfulfilled and re-issues the unfulfilled requests to the second container. As discussed below, this can enable the requests to be addressed by the second container without requiring client devices to re-issue their requests.

In some implementations, after starting execution of the second container, the system transfers one or more communication sessions of the first container to the second container. The second container then continues the one or more communication sessions that were initiated with the first container. The transfer may occur in response to determining that the level of activity of the first container is below the threshold. For example, when the system determines that the activity level on the first container has fallen below a threshold level (e.g., a predetermined amount of active sessions, active users, pending tasks, etc.), the system may stop processing on the first container and shift future processing to the second container. This may be done in various ways. As an example, a record of active sessions of the first container, along with related information for the sessions (e.g., user identifiers, authentication or authorization tokens, session identifiers, working data sets, etc.) can be provided to the second container. As a result, the second container can open sessions that match the existing sessions. As another option, with the session information, the second container may use the session information to create new sessions for the same users or devices as the old sessions, and can provide the new session information to the users or devices.

If a request is provided to the first container but not yet fulfilled by the first container when the first container is stopped, the request and any associated data can be provided to second container. For example, the system can effectively repeat or re-issue, to the second container, the request that was previously issued to the first container, with the second container being provided the session history and other data that may be needed to fulfill the request. The second container can then provide a response to a request previously routed to the first container.

In some cases, the system may extract and transfer state information about work in progress at the first container to the second container. As an example, consider a case where the first container is has generated 100 pages of a 500-page report when the system determines to stop the first container. The system can transfer the data for the report generation task, such as temporary files, cached data, partially completed objects, and so on to the second container and request that the second container complete the task. This may involve the system generating a customized request (e.g., different from the initial request from the client device) that refers to the resources representing partial work completed and limits the amount of processing requested to the amount still needed for completion.

In some implementations, the server environment is configured to provide an analytics service to a plurality of client devices and over a computer network using interactions of the plurality of modules running in the respective containers. The server environment may be configured to perform analytics tasks such as generating a visualization, responding to a query, generating a report or dashboard, and/or providing access to a database.

The server environment can provide business intelligence applications and services. In some implementations, the plurality of containers includes containers providing external-facing interfaces accessible over a computer network and containers that provide internal interfaces configured to communicate only with other containers in the server environment. The plurality of containers includes a container for each of: a front-end interface module configured to receive user-initiated requests over a network; a library module configured to provide access to a set of documents available through the server environment; one or more analytics modules configured to process queries, generate reports, perform online analytical processing; a collaboration module configured to permit comments and/or notifications to be shared among users of the server environment; and a data access module configured to retrieve information from one or more data sources that include at least one database, data cube, or data set.

Figure 6:
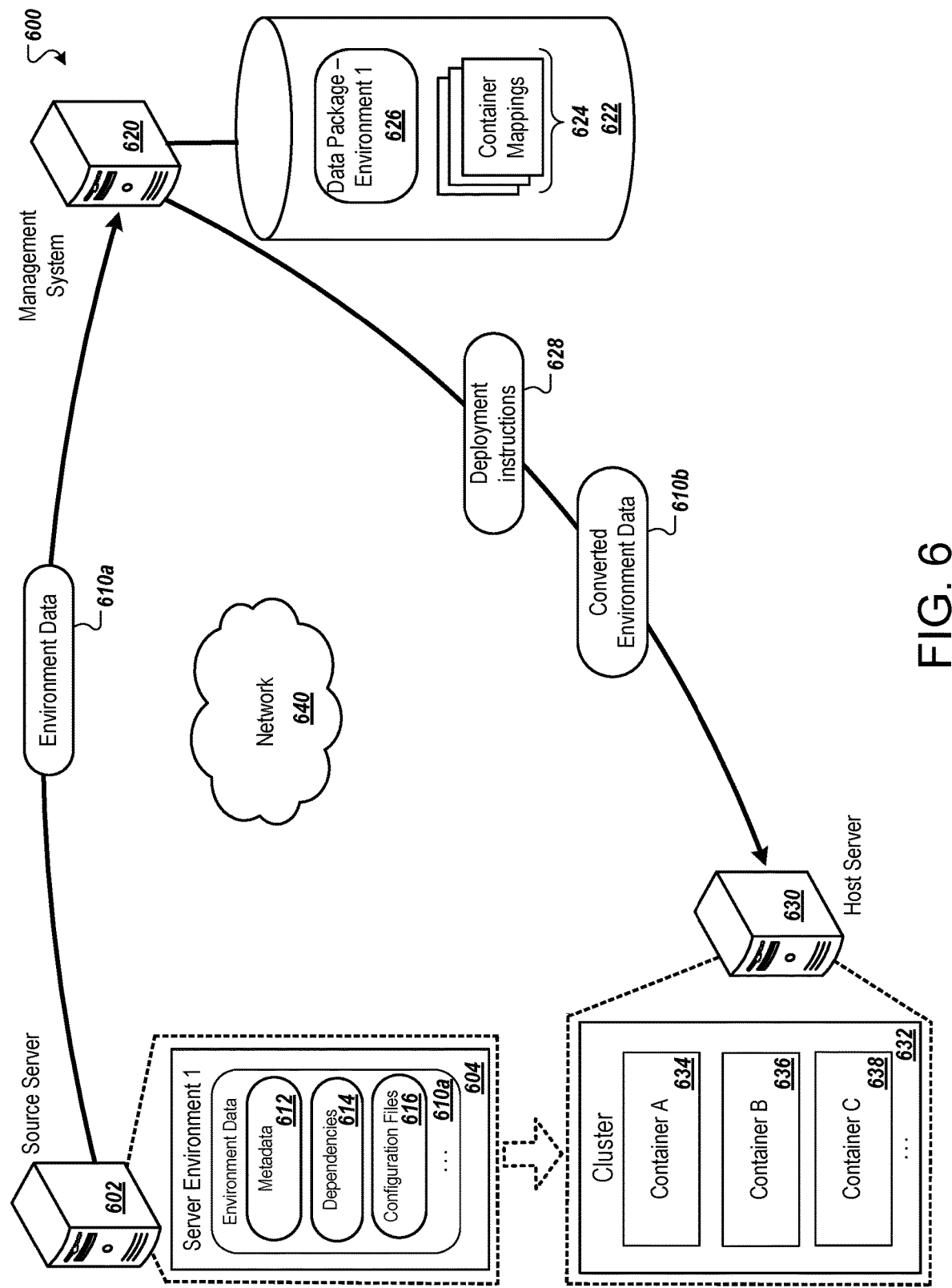
FIG. 6 is a diagram showing an example of a system for converting server environments to container-based implementation.

FIG. 6 is a diagram showing an example of a system 600 for converting server environments to a container-based implementation. Through the system 600, a server environment 604 can be redeployed in a container-based deployment, e.g. in a container cluster 632. The conversion process may be initiated and carried out by a management system 600. The management system may obtain environment data 610a from the server 602 of the server environment 604 and convert the environment data 610a to environment data 610b for deployment into various containers that form the cluster 632 and which may perform a variety of different server functions.

In order to generate and deploy the containers, the system 600 may leverage one or more container engines or technologies such as, for example, Docker and/or CoreOS rkt. In order to arrange the containers to perform a variety of different server functions, the system 600 may leverage one or more container orchestration engines (COEs) such as, for example, Kubernetes, Mesos, and/or Docker Swarm.

The system 600 may include the management system 620, a host server 630, and the data storage 622. The system 600 may further include the server 602. The management system 620 may communicate with the server 602 and/or the host server 630 over, for example, the network 640.

The management system 620 can be or include one or more electronic devices such as one or more computing device. The management system 620 can be, include, or be part of a server. The management system 620 can be, for example, a desktop computer, a laptop computer, a smart phone, a cell phone, a tablet, a PDA, etc. The management system 620 may include multiple computers or other computing devices. The management system 620 may be accessible to a system administrator. The management system 620 may receive instructions or commands from a system administrator. The management system includes and/or has access to the data storage 622.

The server 602 is a server system and can include one or more computing devices. In some implementations, the server 602 is located on the premises of a customer, e.g., on-premises. In other implementations, the server 602 is not located on the premise of a customer, e.g. off-premise. In these implementations, the server 602 may be part of a cloud provider, e.g., a third-party server system, such as, for example, Amazon Web Services (AWS), Microsoft Azure, or Google Cloud Platform (GCP).

The host server 630 is a server system and can include one or more computing devices. In some implementations, the host server 630 is located on the premises of a customer, e.g. on-premises. In other implementations, the host server 630 is not located on the premises of a customer, e.g. off-premise. In these implementations, the host server 630 may be part of a cloud provider, e.g., a third-party server system, such as, for example, Amazon Web Services (AWS), Microsoft Azure, or Google Cloud Platform (GCP). In some implementations, the host server 630 is the host server 102 shown in FIG. 1. In some implementations, the host server 630 is the host server 202 shown in FIG. 2.

The data storage 622 may be located on the premises of a customer, e.g., on-premises, as part of, for example, the management system 620. The data storage 622 may be located off-premise as part of, for example, a cloud provider. In some implementations, the data storage 622 may include one or more software images. In these implementations, the data storage 622 may serve as a repository of software images. In other implementations, the system 600 may include a repository containing a collection of software images that is separate to the data storage 622.

The network 640 can include public and/or private networks and can include the Internet.

In general, a software image may refer to a snapshot, or template, from which new containers can be started. In serving as a snapshot or template, a single software image can be used to deploy multiple containers, with each container running a different instance of the same software image. A software image may include all of the components necessary for running a container. These various components may include, for example, dependencies such as libraries and/or tools, code, a configuration file, one or more drivers, and/or settings. The software image may also contain references, pointers, or links to objects such as files outside of the software image and/or the corresponding container. A software image may be composed of a set of read-only layers. A software image may be modified, for example, by adding a new layer to the set of read-only layers. A software image may be associated with a particular application or function. Similarly, the components of a software image may be associated with a particular application or function.

The techniques disclosed in this document can be used to more conveniently provide server functions. By implementing a containerized deployment such as the cluster 632, the system 600 is able to perform a variety of different server functions without requiring separate servers. Accordingly, users may be able to conveniently access and utilize a variety of server functions from a single containerized deployment.

The techniques disclosed in this document can be used to provide improved server management capabilities. By converting server environments or deployments into container-based modules or restoring server environments into container-based modules, the system 600 allows the management system 620 and/or system administrators to effectively access and manage the multiple server environments from a single location.

As shown in FIG. 6, the server 602 includes a server environment ("Server Environment 1"). The server environment 604 includes environment data 610*a*. The environment data 610*a* is data pertaining to the server environment 604 and includes, for example, metadata 612, dependencies 614, and configuration files 616.

The environment data 610*a* may also include information on the enterprise application being run on server environment 604, such as, for example, the build version of the enterprise application.

The metadata 612 is metadata associated with server environment 604. The metadata 612 may include, for example, titles, descriptions, tags, categorizations, dates, permissions, etc. The metadata 612 may include data that describes data objects within the server environment 604 such as, for example, data objects in various enterprise systems and applications associated with the server environment 604. The dependencies 614 are the links existing between data objects found within server environment 604. The configuration files 616 contain the configuration settings or parameters for server environment 604.

In some implementations, the management system 620 may have received an indication to start the conversion of the server environment 604 to a container-based deployment. The indication may be one or more instructions or commands from a system administrator. The indication may have been received by the management system 620 over the network 640. The indication may have identified the server environment 604 as the server deployment to be converted, may have identified the host server 630 as a destination server, may have identified the cluster 632 as a destination environment or deployment, may have included instructions to deploy one or more new containers and/or a new cluster for the conversion and redeployment of the server environment 604, etc.

As shown, the server 602 sends, and the management system 620 receives, the environment data 610*a*. The server 602 may have sent the environment data 610*a* in response to a request by the management system 620. The management system 620 may have sent the server 602 a request over the network 640. In some implementations, management system 620 receives the environment data 610*a* as a compressed file (e.g., a Zip file) and proceeds to extract its contents.

Once the management system 620 receives the environment data 610*a*, the management system 620 converts the environment data 610a into the environment data 610b. In converting the environment data 610a into the environment data 610b, the management system 620 may compare the environment data 610a with the container mappings 624. By comparing the environment data 610a with the container mappings 624, the management system 620 may determine what containers would be needed, e.g. what container-based modules or applications would be needed, in order to deploy the environment data 610a as a containerized deployment.

In some implementations, the management system 620 may convert the environment data 610a into a standard or universal format through the creation of a data package 626 and then convert the data package into the environment data 610b. The data package 626 may serve as a backup for the server environment 604 and/or a backup for other server environments. The data package 626 may consist of data cubes, caches, database dumps, third-party images and plugins, and/or metadata configuration settings for the server environment 604 and/or other server environments. The management system 620 may automatically convert the environment data 610a into the standard or universal format. The management system 620 may automatically generated the data package 626, for example, during the process of converting the environment data 610a into the standard or universal format.

In these implementations, the management system 620 may compare the data package 626 with the container mappings 624 instead of directly comparing the environment data 610a received from the server 602 with the container mappings 624. The data package 626 may be or may be included as part of an archive, e.g. the archive 706 described below with respect to FIG. 7. The management system 620 may store the data package 626 as a ZIP file.

In converting the environment data 610a into the environment data 610b, the management system 620 may identify and maintain dependencies or links between software through the conversion process. For example, the management system 620 may identify dependencies existing within environment data 610a, e.g. now within the data package 626, and ensure that those dependencies remain intact in the environment data 610b.

In converting the environment data 610a into the environment data 610b, the management system 620 may organize the environment data 610a, e.g. now within the data package 626, into different groups. Each of these groups may correspond with a different container. The management system 620 may identify these different groups and/or containers based off of the comparison of the environment data 610a with the container mappings 624. The management system 620 may identify these different groups and/or containers based off of the comparison of the data package 626 with the container mappings 624. For example, the environment data 610a, e.g. now within the data package 626, may be organized into a first data group for a container 634 ("Container A") associated with a first application or server function, into a second data group for a container 636 ("Container B") associated with a second application or server function, and into a third data group for a container 638 ("Container C"). Together the first data group associated with the container 634, the second data group associated with the container 636, and the third data group associated with the container 638 may form the environment data 610b. The first data group associated with the container 634, the second data group associated with the container 636, and/or the third data group associated with the container 638 may include overlapping data form the environment data 610a. For example, all three data groups may get all or a portion of the configuration files 616 of the environment data 610a.

The containers 634, 636, and 638 may each be associated with a different application, service, module, or server function. The containers 634, 636, and/or 638 may correspond with one or more applications, services, modules, or server functions that were included in the server 602, e.g., that were being run on the server environment 604. As will be discussed in more detail below with respect to FIGS. 7-8, the environment data 610a may indicate or otherwise include an indication of these one or more applications, services, modules, or server functions. For example, the management system 620 may refer to the container mappings 624 to determine the applications, services, modules, or server functions that correlate with all or portions of the received environment data 610a. In this example, based off of this determination, the management system 620 may identify those applications, services, modules, or server functions as applications, services, modules, or server functions that are needed in the container-based implementation of the host server 630.

In converting the environment data 610a into the environment data 610b, the management system 620 may have to modify and/or reorganize the components of the environment data 610a, e.g. now within the data package 626. These modifications and/or organizations may be based on the host server 630, the cluster 632, and/or the containers 634, 636 and 638 that the environment data 610b is to be deployed in. For example, the management system 620 may have to modify the metadata 612, the dependencies 614, and/or the configuration files 616. In this example, the metadata 612, the dependencies 614, and/or the configuration files 616 may need to be modified based on requirements of the containers 634, 636, and 638, the cluster 632, and/or the host server 630. For example, the management system 620 may modify the metadata 612, e.g. now as part of the data package 626, to accommodate the file locations and hostnames within the cluster 632.

The management system 620 may also generate deployment instructions 628. For example, the management system 620 may create a script (e.g., SQL script) for loading the environment data 610b onto the host server 630. The script may serve as the deployment instructions 628 and contains any changes, instructions, and/or updates that are to be run on containerized environment, e.g. the cluster 632. As an example, the management system 620 may create a script to load different portions of the environment data 610b into existing containers within an existing cluster on the host server 630. In this example, the containers 634-638 may have already been deployed within the cluster 632 on the host server 630, and the management system 620 loads different portions of the environment data 610b into each of the containers 634, 636, and 638.

As another example, the management system 620 may create a script to generate one or more new containers and to load different portions of the environment data 610b into existing containers and the one or more new containers within an existing cluster on the host server 630. In this example, the management system 620 may generate one or more software images for each of the one or more new containers. These one or more software images may be provided by the management system 620 along with the script. The management system 620 may include the script as part of the deployment instructions 628. The management system 620 may generate the one or more software images by identifying one or more software images that correspond with one or more applications, services, modules, or server functions that were included in the server 602, e.g. that were used in the server environment 604. In generating the one or more software images, the management system 620 may identify a subset of data within the environment data 610a, convert the data for the one or more software images (e.g. resulting in the environment data 610b), and proceed to modify the one or more identified software images using the converted data, e.g. the management system 620 may identify application settings in a portion of the environment data 610a that corresponds with a first software image, convert that portion of the environment data for application to the first software image, and proceed to apply the converted settings to the first software image such that the modified software image has a configuration that is consistent with configuration data found in the portion of the environment data 610a. The script may include instructions to run the one or more software images, resulting in the creation of the container 634, 636, and/or 638.

In this example, the containers 634 and 636 may have already been deployed within the cluster 632 on the host server 630, and the host server 630 deploys the container 638 as a new container within the cluster 632 in accordance with the received deployment instructions 628. In this example, the management system 620 may loads different portions of the environment data 610b into each of the containers 634, 636, and 638, e.g. the deployment instructions 628 may identify three portions of the environment data 610b that correspond with either the container 634, 636, or 638 and may instruct the host server 630 to modify each of the containers 634, 636, and 638 using a respective portion of the environment data 610b so that a configuration of each of the modified containers 634, 636, and 638 is consistent with configuration data found in each respective portion of the environment data 610b. However, in this example, a portion of the environment data 610b may have already been incorporated into the container 638 when the management system 620 generated a software image to be run as the container 638 on the host server 630.

As another example, the management system 620 may create a script to generate all new containers and to load different portions of the environment data 610b into the new containers within an existing cluster on the host server 630. In this example, the management system 620 may generate multiple software images for each of the new containers 634, 636, and 638. These software images may be provided by the management system 620 along with the script. The management system 620 may include the script as part of the deployment instructions 628. The management system 620 may generate the software images for the containers 634, 636, and 638 by identifying software images that correspond with the one or more applications, services, modules, or server functions that were included in the server 602, e.g. that were used in the server environment 604. In generating the multiple software images, the management system 620 may identify multiple subsets of data within the environment data 610a, convert each of the subsets of data for a respective software image (e.g. resulting in the environment data 610b), and proceed to modify the multiple identified software images using the converted data, e.g. the management system 620 may identify multiple application settings in a plurality of portions of the environment data 610a that each correspond with a software image, convert each portion of the environment data for application to a respective software image, and proceed to apply each of the converted settings to a respective software image such that each modified software image has a configuration that is consistent with configuration data found in a respective portion of the environment data 610a. The script may include instructions to run the multiple software images, resulting in the creation of the containers 634, 636, and 638.

In this example, the host server 630 deploys the containers 634, 636, and 638 within the cluster 632 as new containers in accordance with the received deployment instructions 628. In this example, the management system 620 loads different portions of the environment data 610b into each of the containers 634, 636, and 638, e.g. the deployment instructions 628 may identify three portions of the environment data 610b that correspond with either the container 634, 636, or 638 and may instruct the host server 630 to modify each of the containers 634, 636, and 638 using a respective portion of the environment data 610b so that a configuration of each of the modified containers 634, 636, and 638 is consistent with configuration data found in each respective portion of the environment data 610b. However, in this example, the different portions of the environment data 610b may have already been incorporated into the container 638 when the management system 620 generated a software image to be run as the container 638 on the host server 630.

As another example, the management system 620 may create a script to generate a new cluster with all new containers and to load different portions of the environment data 610b into the new containers on the host server 630. In this example, the management system 620 may generate multiple software images for each of the new containers 634, 636, and 638. These software images may be provided by the management system 620 along with the script. The management system 620 may include the script as part of the deployment instructions 628. The management system 620 may generate the software images for the containers 634, 636, and 638 by identifying software images that correspond with the one or more applications, services, modules, or server functions that were included in the server 602, e.g. that were used in the server environment 604. In generating the multiple software images, the management system 620 may identify multiple subsets of data within the environment data 610a, convert each of the subsets of data for a respective software image (e.g. resulting in the environment data 610b), and proceed to modify the multiple identified software images using the converted data, e.g. the management system 620 may identify multiple application settings in a plurality of portions of the environment data 610a that each correspond with a software image, convert each portion of the environment data for application to a respective software image, and proceed to apply each of the converted settings to a respective software image such that each modified software image has a configuration that is consistent with configuration data found in a respective portion of the environment data 610a. The script may include instructions to run the multiple software images, resulting in the creation of the containers 634, 636, and 638.

In this example, the host server 630 generates the cluster 632 as a new cluster and deploys the containers 634, 636, and 638 within the cluster 632 as new containers in accordance with the received script and deployment instructions 628. In this example, the management system 620 loads different portions of the environment data 610b into each of the containers 634, 636, and 638, e.g. the deployment instructions 628 may identify three portions of the environment data 610b that correspond with either the container 634, 636, or 638 and may instruct the host server 630 to modify each of the containers 634, 636, and 638 using a respective portion of the environment data 610b so that a configuration of each of the modified containers 634, 636, and 638 is consistent with configuration data found in each respective portion of the environment data 610b. However, in this example, the different portions of the environment data 610b may have already been incorporated into the container 638 when the management system 620 generated a software image to be run as the container 638 on the host server 630.

In some implementations, the management system 620 may create a script to deploy the environment data 610b on multiple clusters.

In some implementations, the management system 620 may create multiple scripts. In these implementations, the management system 620 may create a first script to deploy a portion of the environment data 610b on the host server 630, and may create one or more other scripts to deploy one or more other portions of the environment data 610b on one or more servers different than the host server 630. In these implementations, the management system 620 may create a script for each of the containers 634, 636, and 638.

In some implementations, the containers 634, 636, and 638 each include an entry point script. For example, the entry point script can be a script that is run when the container is first run. In these implementations, each of the containers 634, 636, and 638 may run a corresponding entry point script that is designed to look for and/or receive configuration information, and to start services, e.g., once the configuration information is identified and/or received. In these implementations, the management system 620 does not necessarily need to generate and send the deployment instructions 628 along with the environment data 610b. For example, once the containers 634, 636, and 638 run their entry point scripts, they may incorporate the environment data 610b provided by the management system 620. In these implementations, the management system 620 does not necessarily need to generate and send the deployment instructions 628 or the environment data 610b. For example, once the containers 634, 636, and 638 run their entry point scripts, they may identify and retrieve the environment data 610b from the data package 626 stored on the management system 620. In some implementations, the entry point script is a DOCKER entrypoint script.

Once the management system 620 has finished generating the environment data 610b and the deployment instructions 628, the management system 620 sends the environment data 610b and the deployment instructions 628 to the host server 630.

Once the host server 630 receives the environment data 610b and the deployment instructions 628, the host server 630 deploys the environment data 610b in accordance with the deployment instructions 628. As described above, deploying the environment data 610b may involve, for example, the host server 630 deploying one or more new containers, and/or generating a new container cluster. Here, the host server 630 deploys the environment data 610b into the containers 634, 636, and 638 within the cluster 632.

Once the host server 630 deploys the environment data 610b into the containers 634, 636, and 638 within the cluster 632, the conversion of the server environment 604 into a containerized deployment is complete.

Figure 7:
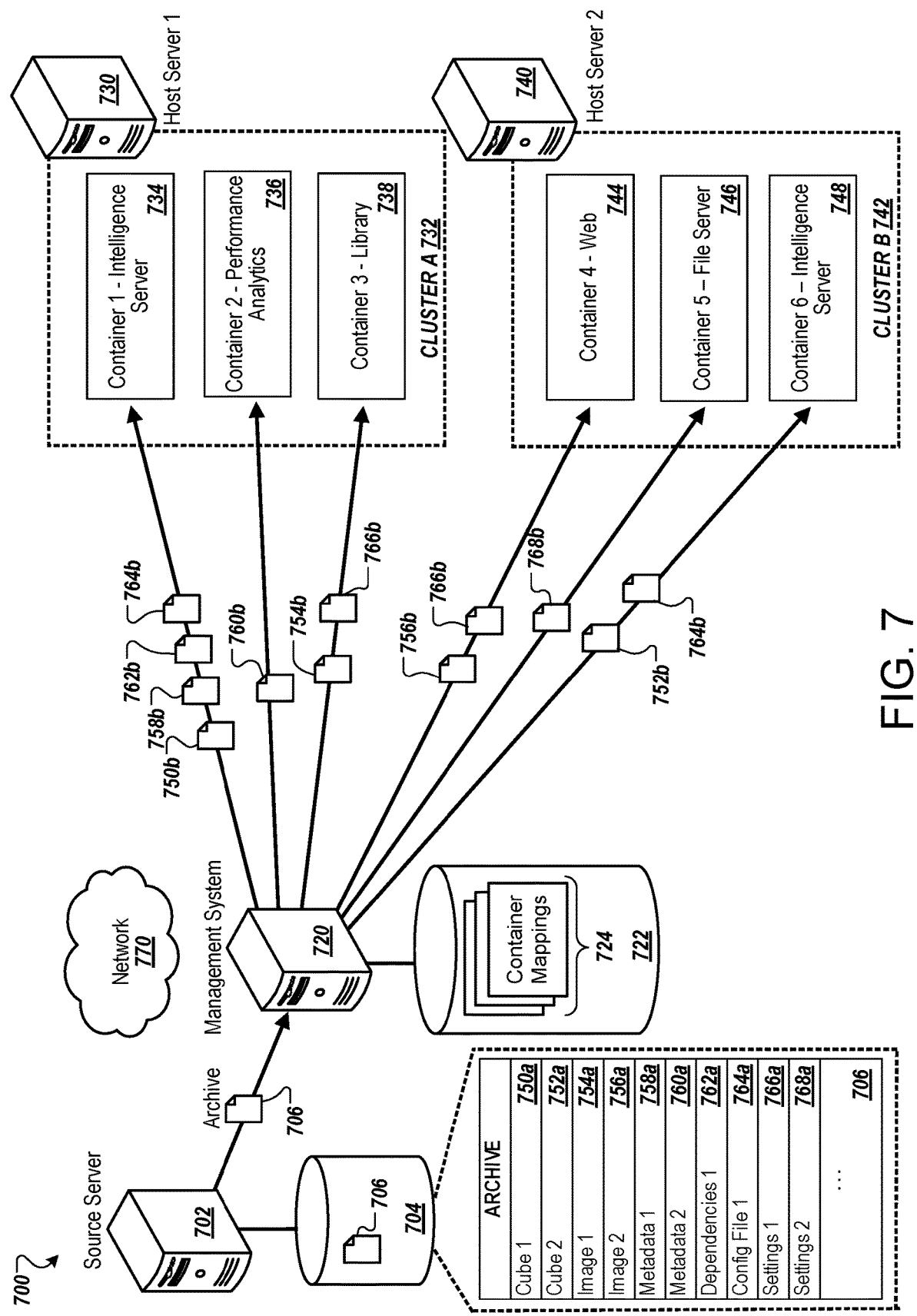
FIG. 7 is a diagram showing an example of a system for restoring server environments to container-based implementation.

FIG. 7 is a diagram showing an example of a system 700 for restoring server environments to container-based implementation. The system 700 includes a server 702, data storage 704, a management system 720, and data storage 722. The system 700 may further include a server 730 and a server 740. The management system 720 is able to communicate with the server 702, the host server 730, and/or the host server 740 over the network 770.

In some implementations, the system 700 is the system 600 shown in FIG. 6.

The management system 720 can be or include one or more electronic devices such as one or more computing device. The management system 720 can be, include, or be part of a server. The management system 720 can be, for example, a desktop computer, a laptop computer, a smart phone, a cell phone, a tablet, a PDA, etc. The management system 720 may include multiple computers or other computing devices. The management system 720 may be accessible to a system administrator. The management system 720 may receive instructions or commands from a system administrator. The management system includes and/or has access to the data storage 722. In some implementations, the management system 720 is the management system 620 shown in FIG. 6.

The server 702 is a server system and can include one or more computing devices. In some implementations, the server 702 is located on the premises of a customer, e.g., on-premises. In other implementations, the server 702 is not located on the premises of a customer, e.g. off-premises. In these implementations, the server 702 may be part of a cloud provider, e.g., a third-party server system, such as, for example, Amazon Web Services (AWS), Microsoft Azure, or Google Cloud Platform (GCP). The management system includes and/or has access to the data storage 704.

The host server 730 is a server system and can include one or more computing devices. In some implementations, the host server 730 is located on the premises of a customer, e.g., on-premises. In other implementations, the host server 730 is not located on the premise of a customer, e.g. off-premise. In these implementations, the host server 730 may be part of a cloud provider, e.g., a third-party server system, such as, for example, Amazon Web Services (AWS), Microsoft Azure, or Google Cloud Platform (GCP). In some implementations, the host server 730 is the host server 630 as shown in FIG. 6.

The host server 740 is a server system and can include one or more computing devices. In some implementations, the host server 740 is located on the premises of a customer, e.g., on-premises. In other implementations, the host server 740 is not located on the premises of a customer, e.g. off-premises. In these implementations, the host server 740 may be part of a cloud provider, e.g., a third-party server system, such as, for example, Amazon Web Services (AWS), Microsoft Azure, or Google Cloud Platform (GCP). In some implementations, the host server 740 is the host server 630 as shown in FIG. 6.

The data storage 704 may be located on the premises of a customer, e.g., on-premises, as part of, for example, the server 702. The data storage 704 may be located off-premise as part of, for example, a cloud provider. The data storage 704 may include one or more data packages or archives for various server environments.

The data storage 722 may be located on the premises of a customer, e.g., on-premises, as part of, for example, the management system 720. The data storage 722 may be located off-premise as part of, for example, a cloud provider. In some implementations, the data storage 722 is the data storage 622 shown in FIG. 6. In some implementations, the data storage 704 may be part of the data storage 722, and vice versa.

The network 770 can include public and/or private networks and can include the Internet. In some implementations, the network 770 is the network 640 shown in FIG. 6.

In FIG. 7, the management system 720 initiates and carries out the restoration of a server deployment to a containerized deployment. The server deployment may have been stored as an archive 706 or as part of the archive 706. The archive 706 may be a ZIP file. The archive 706 may be a backup for one or more server deployments or environments. For example, the archive 706 may be a data package generated for a server environment. As another example, the archive 706 may include multiple data packages generated for multiple server environments.

In restoring the server deployment to a containerized deployment, the management system 720 may identify one or more servers or server environments to serve as hosts of the restored deployment. In restoring the server deployment to a containerized deployment, the management system 720 may identify one or more containerized deployments, such as one or more clusters, existing on a host server or server environment to be used in the restoration process. In restoring the server deployment to a containerized deployment, the management system 720 may provide instructions to generate one or more containerized deployments, such as one or more clusters, on a host server or server environment to be used in the restoration process. In restoring the server deployment to a containerized deployment, the management system 720 may identify one or more existing containers of a containerized deployment to be used in the restoration process. In restoring the server deployment to a containerized deployment, the management system 720 may provide instructions to generate one or more containers within a containerized deployment to be used in the restoration process.

In restoring the server deployment to a containerized deployment, the management system 720 may distribute all or part of the archive 706 to one or more host servers or environments, one or more containerized deployments, and/or one or more containers. In restoring the server deployment to a containerized deployment, the management system 720 may distribute one or more components of the archive 706 to one or more host servers or environments, one or more containerized deployments, and/or one or more containers.

In restoring the server deployment to a containerized deployment, the management system 720 may translate or otherwise modify the individual components of the archive 706 for the particular host server or environment, the particular containerized deployment, and/or the particular container that individual components of the archive 706 are being distributed to.

As shown, the archive 706 is stored in the data storage 704 and is accessible by the server 702. The archive 706 includes various files, settings, or configurations related to one or more server environments or deployments. Here, the archive 706 includes a first data cube 750a, a second data cube 752a, a first software image 754a, a second software image 756a, first metadata 758a, second metadata 760a, dependencies 762a, a configuration file 764a, first settings 766a, and second settings 768a. The settings 766a and 768a may include, for example, container network polices. The settings 766a and 768a may include, for example, configuration settings of one or more containers or software images.

As shown, the server 702 sends, and the management system 720 receives, the archive 706. The server 702 may have sent the archive 706 in response to a request by the management system 720. The management system 720 may have sent the server 702 a request over the network 770.

Once the management system 720 receives the archive 706, the management system 720 may continue the restoration process by comparing the archive 706 with the container mappings 724 stored in the data storage 722. The management system 720 may make this comparison in a method similar to that described above regarding a comparison between container mappings and environment data with respect to FIG. 6. Based off of the comparison, the management system 720 may determine one or more containers required to deploy the archive 706. For example, based off of the comparison, the management system 720 may determine that an intelligence server container, such as container 734 and container 748, is required to deploy the archive 706. Based off of the comparison, the management system 720 may determine that a performance analytics container, such as container 736, is required to deploy the archive 706. Based off of the comparison, the management system 720 may determine that a library container, such as container 738, is required to deploy the archive 706. Based off of the comparison, the management system 720 may determine that a web interface container, such as container 744, is required to deploy the archive 706. Based off of the comparison, the management system 720 may determine that a file server container, such as container 746, is required to deploy the archive 706. Based off of the comparison, the management system 720 may determine that more than a single container for a specific application is needed. For example, the management system 720 may determine that two intelligence server containers are needed. The management system 720 may make this determination based off of, for example, there being two different data cubes 750a and 752 within the archive 706, each of the data cubes 750a and 752a being associated with an intelligence server application, and/or a single intelligence server application being limited to using a single data cube.

The containers 734 and 748 are intelligence server containers. The containers 734 and 748 may be each running an intelligence server module or application. The intelligence server containers 734 and 748 may each provide an analytics and/or BI platform. The intelligence server containers 734 and 748 may each provide an analytics and/or BI platform that can be used by other applications or functions such as the applications and/or functions deployed in one or more of the other containers. For example, the intelligence server containers 734 and 748 may each provide an integrated platform for BI monitoring, reporting, and analysis.

The container 736 is a platform analytics container. The container 736 may be running a platform analytics module or application. The platform analytics container 736 may provide monitoring capabilities. For example, the platform analytics container 736 may provide a monitoring tool to collect platform data, e.g. telemetry. The platform analytics container 736 may allow for the collection of data from various server environments, users, data cubes, etc.

The container 738 is a library container. The container 738 may be running a library module or application. The library container 738 may provide a front-end interface that can interact with various the client devices. Client device users may be able to use the library container 738 for analytics and/or BI. For example, users may be able to use the library container 738 for BI reporting and analysis. As an example, the web interface container 710a may provide users of the client devices 730-734 an interface to view, analyze, and consume various reports and documents.

The container 744 is a web interface container. The container 744 may be running a web interface module or application. The web interface container 744 may provide a front-end interface that can interact with various client devices. Client device users may be able to use the web interface container 744 for analytics and/or BI. For example, users may be able to use the web interface container 744 for BI reporting, analysis, and/or monitoring. For example, the web interface container 744 may provide users a single, unified web interface in which to perform the major styles of BI such as, for example, scorecards and dashboards, enterprise reporting, online analytical processing (OLAP) analysis, predictive analysis, and alerts and proactive notification. The web interface container 744 may allow users to move seamlessly between the various styles of BI and to combine multiple styles within a single report display.

The container 746 may be a file server container. The container 746 may be running a file server application or module. The file server container 746 may provide an application or function associated with an external data store or database.

Based off of the comparison, the management system 720 may convert the archive 706 and/or the components of the archive 706 for a containerized deployment. The conversion of the archive 706 and/or the components of the archive 706 may follow the methods described above for converting environment data with respect to FIG. 6.

In converting or translating the archive 706 and/or the components of the archive 706 for a containerized deployment, the management system 720 may take into account the specific requirements or limitations of the containerized destination. For example, the management system 720 may take into account the specific requirements or limitations of the host server 730, a cluster 732 running on the host server 730, and/or the containers 734, 736, and 738. For example, the management system 720 may take into account the specific requirements or limitations of the host server 730, a cluster 732 running on the host server 730, and/or the containers 734, 736, and 738 and use these requirements or limitations to modify the components of the archive 706.

The archive 706 and/or components of the archive 706 may have been modified by the management system 720 or may have been combined with, for example, deployment instructions. The resulting components of the archive 706 to be sent out for containerized deployment by the management system 720 include the first data cube 750b, the second data cube 752b, the first software image 754b, the second software image 756b, the first metadata 758b, the second metadata 760b, the dependencies 762b, the configuration file 764b, the first settings 766b, and the second settings 768b.

The comparison of the archive 706 and/or the components of the archive 706 by the management system 720, may results in the management system 720 determining that the first cube 750b, the first metadata 758b, the dependencies 762b, and the configuration file 764b should be sent to the host server 730 for deployment into the container 734 within the cluster 732.

The comparison of the archive 706 and/or the components of the archive 706 by the management system 720, may results in the management system 720 determining that the second metadata 760b should be sent to the host server 730 for deployment into the container 736 within the cluster 732.

The comparison of the archive 706 and/or the components of the archive 706 by the management system 720, may results in the management system 720 determining that the first software image 754b and the first settings 766b should be sent to the host server 730 for deployment into the container 738 within the cluster 732.

The comparison of the archive 706 and/or the components of the archive 706 by the management system 720, may results in the management system 720 determining that the second software image 756b and the first settings 766b should be sent to the host server 740 for deployment into the container 744 within the cluster 742.

The comparison of the archive 706 and/or the components of the archive 706 by the management system 720, may results in the management system 720 determining that the second settings 768b should be sent to the host server 740 for deployment into the container 746 within the cluster 742.

The comparison of the archive 706 and/or the components of the archive 706 by the management system 720, may results in the management system 720 determining that the second data cube 752b and the configuration file 764b should be sent to the host server 740 for deployment into the container 7448 within the cluster 742.

In some implementations, one or more of the components of the archive 706 are not modified during the conversion process. For example, the software images 754a and 756a may not have been modified by the management system 720. Accordingly, the software images 754a and 756a may be the same as the software images 754b and 756b respectively.

In some implementations, management system 720 does not convert the archive 706 and/or the components of the archive 706. For example, the archive 706 may already be in a format suitable for deployment when the management system 720 receives the archive 706 from the server 702. In these implementations, the management system 720 may still compare the archive 706 and/or the components of the archive 706 with the container mappings 724. In these implementations, the management system 720 may still generate deployment instructions for the archive 706 and/or the components of the archive 706 as is discussed in more detail below.

As discussed above with respect to FIG. 6, the management server 720 may generate deployment instructions for the converted archive 706, for each of the host servers 730 and 740, for each of the converted components of the archive 706. For example, the management system 720 may generate a single script that is sent to both the host server 730 and the host server 740 to deploy the converted archive and/or the converted components of the archive 706. As another example, the management system 720 may generate a first script for the host server 730, and a second script for the host server 740. In this example, the first script may contain instructions for deploying the first cube 750b, the first metadata 758b, the dependencies 762b, and the configuration file 764b into the container 734. In this example, the first script may contain instructions for deploying the second metadata 760b into the container 736. In this example, the first script may contain instructions for deploying the first software image 754b and the first settings 766b cube 750b, the first metadata 758b, the dependencies 762, and the configuration file 764b into the container 734.

The script may additionally contain instructions to generate one or more of the containers 734-738 and 744-748. The script may additionally contain instructions to generate the cluster 732 and/or the cluster 742.

In cases where the management system 720 generates a script in order to generate one or more containers and to load different portions of the converted components of the archive 706 into the container-based implementation of the host server 730 and/or the host server 740, the management system 720 may generate one or more software images for one or more of the containers 734-738 and 744-748. These software images may be provided by the management system 720 along with the generated script. The management system 720 may include the script as part of deployment instructions sent to the host server 730 and/or the host server 740. The management system 720 may generate the one or more software images for one or more of the containers 734-738 and 744-748 by identifying software images that correspond with the one or more applications, services, modules, or server functions that were included in the server 702, e.g. that were used in a server environment of the server 702 that was backed-up to the archive 706. In generating the multiple software images, the management system 720 may identify one or more subsets of components within the archive 706, convert each of the components of each subset for a respective software image (e.g. resulting in data cube 750*a* being converted into data cube 750*b*), and proceed to modify the one or more identified software images using the converted data. The script may include instructions to run the one or more software images, resulting in the creation of one or more of the containers 734-738 and 744-748.

In these cases, the host server 730 and/or the host server 740 deploys one or more of the containers 734-738 and 744-748 within the clusters 732 and 742, respectively, as new containers in accordance with the received deployment instructions and/or script from the management system 720. In this example, the management system 720 loads different components of the archive 706 into each of the containers 734-738 and 744-748, e.g. the deployment instructions and/or script may identify six subsets of components of the archive 706 that each correspond with one of the containers 734-738 and 744-748 and may instruct the host servers 730 and 740 to modify each of the containers 734-738 and 744-748, respectively, using a corresponding subset of components of the archive 706 so that a configuration of each of the modified containers 734-738 and 744-748 is consistent with components of the archive 706. However, in this example, one or more components of the archive 706 (e.g., the settings 766*b*, the settings 768*b*, the configuration file 764*b*, etc.) may have already been incorporated into respective containers when the management system 720 generated one or more software images to be run as one or more of the containers 734-738 and 744-748.

In these cases, the software images may be stored on the data storage 722. The software images may include a predetermined set of software images. Each software image in the set may correspond with one or more applications, services, software modules, or server functions. Each of the software images may have an initial configuration. These initial configurations may be defined by a configuration settings. In these cases, in generating a software image, the management system 720 may select one or more software images from the set of predetermined software images and modify a the settings of the one or more software images using one or more components from the archive 706.

In these cases, upon generating one or more software images, the management system 720 may store the generated software images in the data storage 722. The management system 720 may make the generated software images available through a repository of software images, e.g. through the data storage 722. If generating a software image involves modifying a software image, the management system 720 may either store the modified software image in addition to the original software image, or the management system 720 may replace the original software image with the modified software image.

In these cases, generating one or more software images may involve the management system 720 distributing data from by the archive 706, e.g. components of the archive 706, among the software images to locations that the software images are configured to retrieve the data when run as containers. Generating one or more software images may further involve the management system 720 modifying metadata from the archive 706 to indicate file locations and hostnames that will be present when the software images are run as containers on the cluster 732 and/or 742.

The components of the archive 706 can be distributed among the different containers. For example, different subsets of the elements of the archive may be distributed between different containers. For example, containers 734 and 736 may receive different components from the archive 706. As another example, different subsets of the components of the archive may be distributed to different containerized deployments such as different clusters. These clusters may be located on the same host server or server environment or on different servers or server environments.

The way in which the components of the archive 706 are to be distributed may be determined by the management system 720. The way in which the components of the archive are to be distributed may be provided in deployment instructions generated by the management system 720.

As shown, the management system distributes the first data cube 750*b*, the second data cube 752*b*, the first software image 754*b*, the second software image 756*b*, the first metadata 758*b*, the second metadata 760*b*, the dependencies 762*b*, the configuration file 764*b*, the first settings 766*b*, and the second settings 768*b* to the host servers 730 and 740. The management system 720 may also send deployments instructions to the host servers 730 and 740.

Upon receiving the components of the archive 706—e.g., the first data cube 750*b*, the second data cube 752*b*, the first software image 754*b*, the second software image 756*b*, the first metadata 758*b*, the second metadata 760*b*, the dependencies 762*b*, the configuration file 764*b*, the first settings 766*b*, and the second settings 768*b*—the host servers 730 and 740 deploy the components of archive 706. The host servers 730 and 740 may deploy the received archive 706 components in accordance with deployment instructions provided by the management system 720.

In some implementations, the management system 720 may create the archive 706. In these implementations, creating the archive 706 may involve the management system 720 comparing settings of the server 702—or the settings of a particular server environment on the server 702—to a set of reference settings, and storing, in the archive 706, settings identified as different from the corresponding settings in the set of reference settings. In these implementations, creating the archive 706 of configuration data may involve the management system 720 generating a ledger of elements of the installation of one or more applications on the server 702 that are different from a reference configuration of the one or more applications. In these implementations, the management system 720 may generate the archive 706 using an automated process performed by one or more computers.

In some implementations, when a software image is sent to the host server 730 and/or 740 to be run as a container, the host server 730 and/or 740 executes the software image. By executing the software image, a respective container may be created on the host server 730 and/or 740. This container provides an application, service, software module, or server function that was previously on the server 702. The configuration of the application, service, software module, or server function provided by the container may be the same as the configuration of the corresponding application, service, software module, or server function that was on the server 702.

In some implementations, where the management system 720 identifies one or more applications and/or software modules from the data in the archive 706, the identified one or more applications and/or software modules may each be a first version of the respective application or software module. In these implementations, the management system 720 may receive an indication of a second version of one or more of the applications and/or software modules to be used for a container-based implementation of the one or more applications and/or software modules. The second version(s) may be different from the first version(s). The second version(s) may provide a different set of functionality compared to the first version(s) or provide additional functionality compared to the first version(s). In these implementations, the management system 720 may identify and convert subsets of components of the archive 706, for example, in generating one or more software images that correspond with the one or more applications and/or software modules. In these implementations, converting the subsets of components of the archive 706 may involve the management system 720 translating one or more components of the archive 706, e.g. settings 766a, for a first version of an application and/or software module to a set of components for a second version of the application and/or software module, e.g. resulting in the settings 766b.

In some implementations, where the management system 720 identifies subsets of components of the archive 706 and/or converts the components within the subsets for a container-based implementation, identifying the subsets of components and/or converting the components in those subsets involves the management system 720 accessing the container mappings 724 that maps various components of the archive 706 (e.g., the settings 766a, the settings 768a, the configuration file 764a, etc.) that correspond with one or more applications, services, software modules, or server functions to different software images. In these implementations, identifying the subsets of components and/or converting the components in those subsets may further involve the management system 720 using the container mappings 724 to distribute the components corresponding with the one or more applications, services, software modules, or server functions among the different software images. In these implementations, identifying the subsets of components and/or converting the components in those subsets may further involve the management system 720 translating, based on the container mappings 724—e.g. based on settings mapping data within the container mappings 724—or translation rules, one or more components (e.g., the settings 766a, the settings 768a, the configuration file 764a, etc.) that correspond with the one or more applications, services, software modules, or server functions to components in a format used by the software images (e.g., the settings 766b, the settings 768b, the configuration file 764b, etc.).

In some implementations, the archive 706 includes data in a standard format for archiving data including at least one of OLAP data cubes, caches, database dumps, software images, plugins, or metadata configuration settings. For example, the components 750a-768a of the archive 706 are shown in various standard formats.

In some implementations, the server 702 includes multiple applications, services, software modules, and/or server functions. In these implementations, the management system 720 may generate software images configured to replicate functionality of each of the multiple applications, services, software modules, and/or server functions using the techniques described above.

In some implementations, the management system 720 generates initialization scripts for the software images. In these implementations, the initialization scripts may be configured to receive configuration information from environment variables and start containers based on the software images. The initialization scripts may be provided by the management system 720 to the host server 730 and/or 740. The initialization scripts may be included as part of the deployment instructions sent by management system 720 to the host server 730 and/or 740.

Figures 8A, 8B:
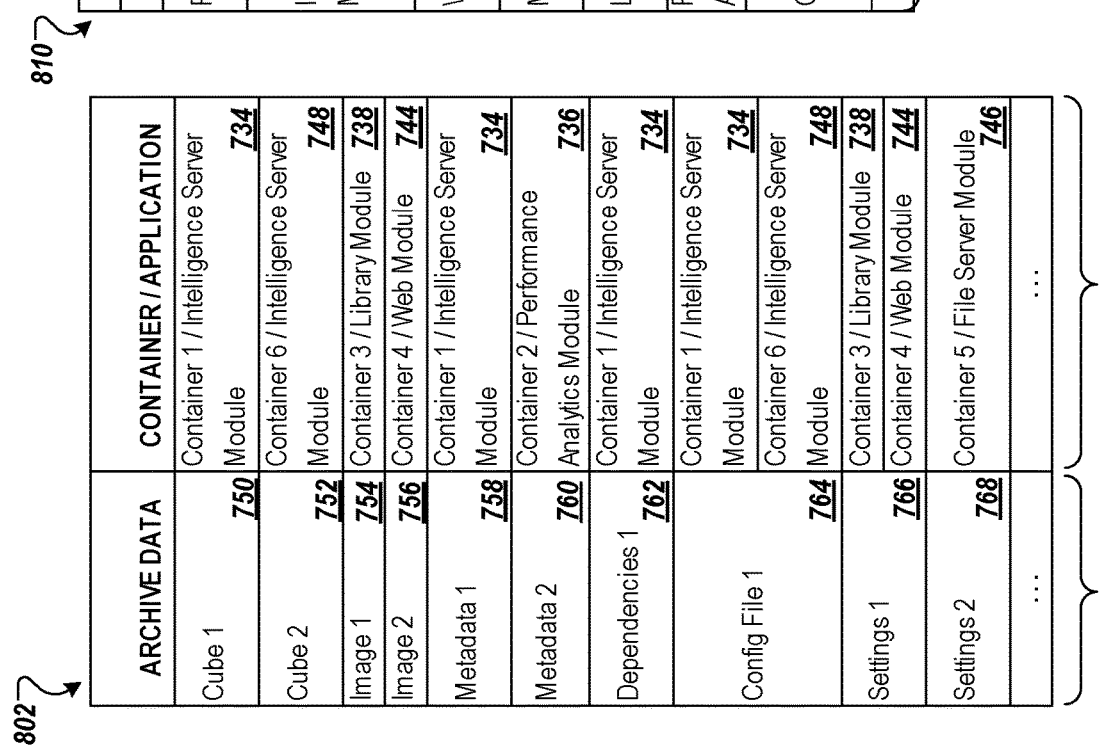
FIG. 8A is a diagram illustrating example mapping data used in the conversion and restoration of server environments to container-based implementation.
FIG. 8B is a diagram illustrating example deployment instructions used in the restoration of server environments to container-based implementation.

FIG. 8A is a diagram illustrating example mapping data 802 used in the conversion and restoration of server environments to container-based implementation.

As shown, the mapping data 802 includes a listing 804 of archive data. The listing 804 of archive data may include various files, settings, and configurations. The listing 804 of archive data may be the same as the archive 706, or include the same components as the archive 706 shown in FIG. 7. The mapping data 802 also includes a listing 806 of containers and applications associated with the listing 804 of archive data. The association between the listing 804 and the listing 806 may be an indication of which containers and/or applications that a specific piece of archive data is compatible with. The association between the listing 804 and the listing 806 may be an indication of which containers and/or applications that a specific piece of archive data should be deployed into.

As shown, the listing 804 of archive data includes the first data cube 750, the second data cube 752, the first software image 754, the second software image 756, the first metadata 758, the second metadata 760, the dependencies 762, the configuration file 764, the first settings 766, and the second settings 768.

As shown, the listing 806 of containers and applications includes the intelligence service container 734, the performance analytics container 736, the library container 738, the web interface container 744, the file service container 746, and the intelligence server container 748. The various containers in the listing 806 may be present within the listing more than one time due to one or more of the containers being a destination for multiple pieces of archive data.

Based off the mapping data 802, the first data cube 750 is compatible with and/or should be deployed into the intelligence service container 734. Based off the mapping data 802, the second data cube 752 is compatible with and/or should be deployed into the intelligence server container 748. Based off the mapping data 802, the first software image 754 is compatible with and/or should be deployed into the library container 738. Based off the mapping data 802, the second software image 756 is compatible with and/or should be deployed into with the web interface module 744. Based off the mapping data 802, the first metadata 758 is compatible with and/or should be deployed into the intelligence service container 734. Based off the mapping data 802, the second metadata 760 is compatible with and/or should be deployed into the performance analytics container 736. Based off the mapping data 802, the dependencies 762 are compatible with and/or should be deployed into the intelligence service container 734. Based off the mapping data 802, the configuration file 764 is compatible with and/or should be deployed into the intelligence service container 734 and/or the intelligence service container 748. Based off the mapping data 802, the first settings 766 are compatible with and/or should be deployed into the library container 738 and/or the web interface container 744. Based off the mapping data 802, the second settings 768 are compatible with and/or should be deployed into the file service container 746.

The system, such as the management system 620 shown in FIG. 6 or the management system 720 shown in FIG. 7, may need to translate one or more of the components of the archive data shown in the listing 804. For example, the first settings 766 may need to be modified in a first way for the library container 738 and may need to be modified in a second way for the web module container 744. The way in which a component needs to be modified may also depend on the specific instance of the application be run. For example, the first settings 766 may need to be modified in a first way for library container 738 but may need to be modified differently for another library container. This may be due to, for example, differences in the servers hosting the two library containers (e.g., to account for software differences between the servers), the two library containers being in two different containerized deployments (e.g., two different clusters), and so on.

In translating one or more components of the archive data shown in the listing 804, the system, such as the management system 620 shown in FIG. 6 or the management system 720 shown in FIG. 7, may modify one or more values of the one or more components. For example, the system may take a value of the first settings 766 as found within the archive data and perform a calculation with the value based on a formula. The formula used may be determined or identified for translating configuration settings for compatibility with the library container 738 or with library containers in general.

FIG. 8B is a diagram illustrating example deployment instructions 810 used in the restoration of server environments to container-based implementation.

The deployment instructions 810 include a listing 812 of various applications or modules, and a listing 814 of restoration steps for restoring archive data to a containerized deployment.

As shown, for a file server module, the restoration steps include restoring server settings.

As shown, for an intelligence server module, the restoration steps include (i) restoring metadata, (ii) restoring configuration files, (ii) running configuration software, and (iii) restoring one or more data cubes and caches. For example, this restoration process would be the restoration process for the intelligence server containers 734 and 748 shown in FIGS. 7-8A.

As shown, for a web interface module, the restoration steps include (i) restoring one or more software images, and (ii) restoring one or more plugins. For example, this restoration process would be the restoration process for the web interface container 744 shown in FIGS. 7-8A.

As shown, for a mobile interface module, the restoration steps include (i) restoring one or more software images, and (ii) restoring one or more plugins.

As shown, for a library module, the restoration steps include (i) restoring one or more software images, and (ii) restoring one or more plugins. For example, this restoration process would be the restoration process for the library container 738 shown in FIGS. 7-8A.

As shown, for a performance analytics module, the restoration steps include (i) restoring an analytics warehouse, (ii) modifying a business intelligence configuration file, (iii) running a shell script, and (iv) running configuration software. For example, this restoration process would be the restoration process for the performance analytics container 736 shown in FIGS. 7-8A.

As shown, for a collaboration module, the restoration steps include restoring an associated database collection for the particular collaboration.

Figure 9:
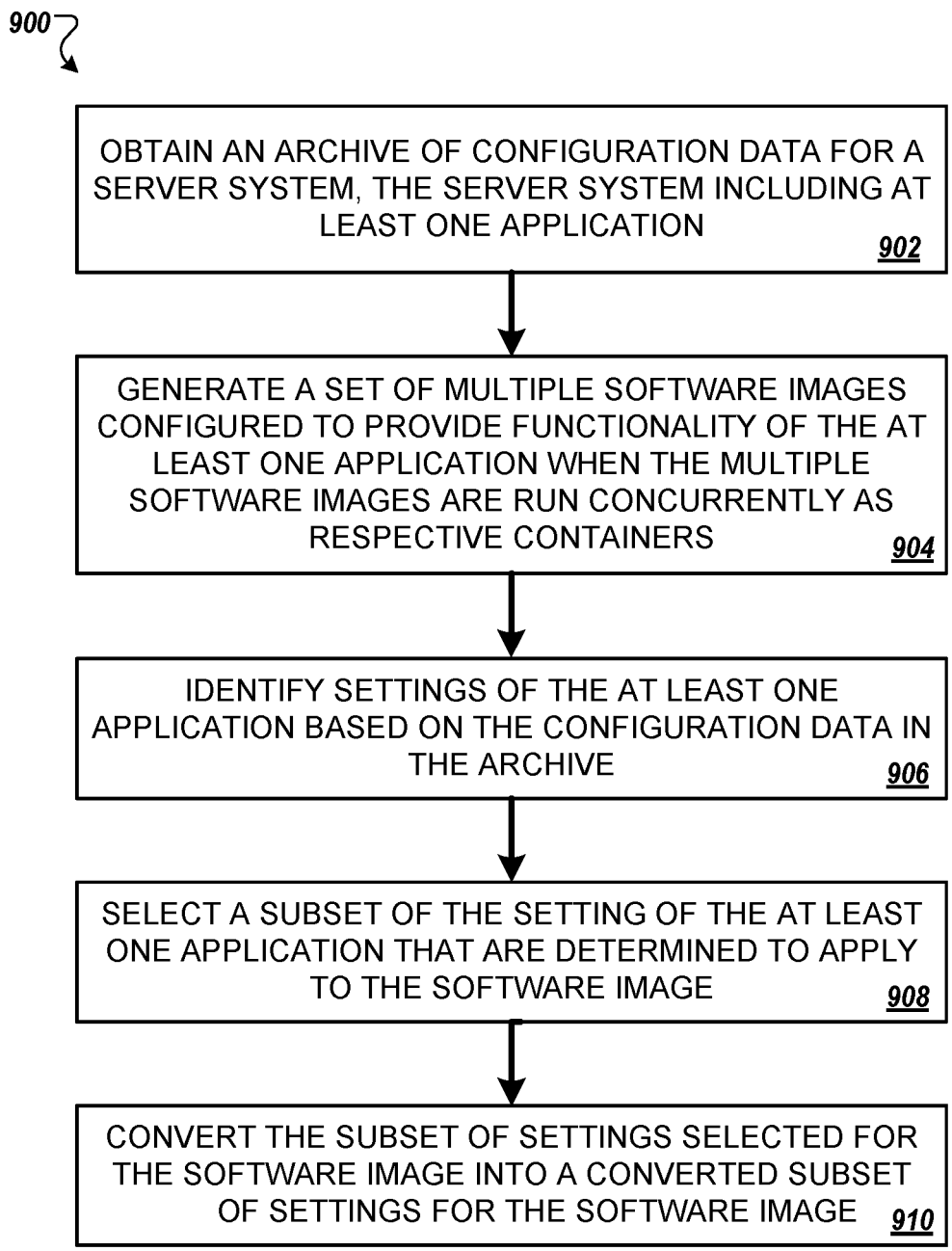
FIG. 9 is a flow diagram showing an example of a process 900 for restoring server environments to container-based implementation.

FIG. 9 is a flow diagram showing an example of a process 900 for restoring server environments to container-based implementation. The process 900 shows how one or more applications or services on a server system can be restored from an archive to a container-based computing environment. Briefly, a management system may obtain an archive from a data storage. This archive may contain data corresponding with a server environment, such as data corresponding to an application or service that was running on a server system. The management system may refer to container mappings in order to determine a set of containers that are needed to receive the data. The management system may generate one or more software images, where each software image corresponds with an application or services that was on the server system. The management system may convert the data in the archive for the particular software image(s) that it generates. The management system may provide the generated software image(s) and the data to one or more additional server systems that can run the software image(s) as one or more containers. This process enables the system to effectively convert one or more applications or services to a container-based implementation while maintaining the configuration that the one or more applications or services had in their initial implementation. This has many benefits including, for example, allowing a variety of different applications, services, or server functions to be run on a single server without requiring separate servers.

The system obtains an archive of configuration data for a server system, the server system including at least one application (902). The application may be a software application, a service, a software module, etc. The application may provide one or more server functions. This may occur automatically, for example, as triggered by the system. This may occur manually, for example, as initiated by an administrator having access to the system or another system user. The server system may be a cloud-based server system. The server system may be an on-premises server system.

In some cases, the system creates the archive of configuration data for the server system. Creating the archive can involve the system comparing settings of the server system to a set of reference settings and storing, in the archive, settings identified as different from the corresponding settings in the set of reference settings. Creating the archive of configuration data may involve the system generating a ledger of elements of the installation of the at least one application on the server system that are different from a reference configuration of the at least one application.

In some cases, the archive includes data in a standard format for archiving data including at least one of OLAP data cubes, caches, database dumps, software images, plugins, or metadata configuration settings.

In some cases, the system generates the archive of the at least one application using an automated process performed by one or more computers.

The system generates a set of multiple software images configured to provide functionality of the at least one application when the multiple software images are run concurrently as respective containers (904). The system may generate the multiple software images such that the multiple software images divide the functionality of at least one application among the respective containers.

In some cases, the software images include a predetermined set of software images corresponding to the at least one application. The system can generate the set of multiple software images by updating the predetermined set of software images with the converted subsets of settings.

In generating the set of multiple software images, the system identifies settings of the at least one application based on the configuration data in the archive (906). These settings may be identified from configuration settings data within the archive. These settings may be identified from one or more configuration files within the archive. These settings may be identified from metadata within the archive.

In generating the set of multiple software images, the system selects a subset of the setting of the at least one application that are determined to apply to the software image (908). The system may select a subset of settings for each of the software images. For example, as discussed above, a mapping may be used to determine which settings from the archive are applicable to each of the different images (e.g., for different containers) that are being generated.

In some cases, selecting the subsets of the settings and/or converting the subsets of settings involves the system accessing a set of mapping data that maps settings of the at least one application to different software images, using the mapping data to distribute the settings of the at least one application among the different software images, and translating, based on settings mapping data or translation rules, settings of the at least one application to settings in a format used by the software images.

In generating the set of multiple software images, the system converts the subset of settings selected for the software image into converted subset of settings for the software image (910). The system may convert the subset of settings for each of the software images. The system can store the generated software images in and make the generated software images available through a repository of software images.

The system may cause one or more of the generated software images to be executed as containers using a second server system, such that the containers of the second server system provide the at least one application with a same configuration as the first server system. In other words, a backup archive of a non-container-based application or server environment may be converted to a container-based application or server environment on a different server system, e.g., different hardware or a different type of platform (e.g., from on-premises to cloud computing software, or vice versa)

In some cases, the at least one application is a first version of the at least one application. In these cases, the system may receive an indication of a second version of the at least one application to be used for a container-based implementation of the at least one application. The second version may be different from the first version. The second version may provide a different set of functionality compared to the first version. In these cases, converting the subsets of settings involves the system translating settings for the first version to a set of settings for the second version.

In some cases, the server system from which he data in the archive was obtained has multiple applications and/or services. The system can generate software images configured to replicate functionality of each of the multiple applications and/or services. The number of containers may be different from the number of services or applications of the server system. For example, there may be 12 software images, representing 12 containers to be run, for a system that has 5 applications, with functionality of at least some applications split among different containers.

In some cases, generating the software images involves the system distributing data from the archive among the software images to locations that the software images are configured to retrieve the data when run as containers (e.g., to particular locations in a file system within the software images), and modifying metadata from the archive to indicate file locations and hostnames that will be present when the software images are run as containers on a cluster. The references that indicate file locations and hostnames can be detected in the content of the archive and the references can be updated or replaced with the new references that are valid in the container-based implementation.

In some cases, the system generates initialization scripts for the software images. In these cases, the initialization scripts may be configured to receive configuration information from environment variables and start containers based on the software images. These environment variables may include, for example, data cubes metadata, dependencies, configuration files, settings, etc. found within the archive.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method comprising:
    storing, by one or more computers, mapping data that maps settings and data elements from source server environments to containers of destination server environments, wherein the mapping data specifies different subsets of the settings and data elements from source server environments to be used in configuring different containers of destination server environments;
    obtaining, by the one or more computers, settings and data elements of a particular server environment that provides functionality that is not implemented as containers;
    selecting, by the one or more computers, multiple software images to use in providing a container-based implementation of the functionality of the particular server environment, the multiple software images being selected from a repository of container software images;
    for each of the multiple software images selected, using, by the one or more computers, the mapping data to select a subset of the settings and data elements of the particular server environment for configuring the software image; and
    applying, by the one or more computers, the selected subsets of the settings and data elements to the corresponding software images in the set of multiple software images, wherein the set of multiple software images is configured to operate together to provide the functionality of the particular server environment when the set of software images are run concurrently as containers.

2. The method of claim 1, further comprising creating a second server environment with the container-based implementation of the functionality of the particular server environment by creating a container for each of the software images in the set of multiple software images.

3. The method of claim 1, comprising transmitting the set of multiple software images to a server system, wherein the server system is configured to run the software images in the set concurrently as respective containers to provide the functionality of the particular server environment.

4. The method of claim 3, wherein transmitting the set of multiple software images to the server system comprises transmitting the set of multiple software images to the server system before applying a subset of the settings and data elements to the software image.

5. The method of claim 1, wherein applying the selected subsets of the settings and data elements to the corresponding software images comprises associating each of the software images in the set of multiple software images with a corresponding configuration file;
   wherein, for at least one of the software images in the set of multiple software images, the configuration file for the software image is based on the subset of settings and data elements selected for the software image; and
   wherein each of the software images is configured to access the associated configuration file when the software image is run as a container.

6. The method of claim 5, wherein each of the configuration files specifies a set of parameters for operation of a container for the corresponding software image or for software running in the container for the corresponding software image.

7. The method of claim 6, wherein the parameters specify at least one of the following:
   a hardware resource allocation for a container that runs an instance of the software image that accesses a configuration file with the parameters;
   a network port assignment for a container that runs an instance of the software image that accesses a configuration file with the parameters;
   a cache size for a container that runs an instance of the software image that accesses a configuration file with the parameters; and
   a capacity limit for a container that runs an instance of the software image that accesses a configuration file with the parameters.

8. The method of claim 5, comprising generating or updating the configuration files based on the subsets of the settings and data elements selected using the mapping data such that content configuration files configure containers with the corresponding software images to replicate the functionality of the particular server environment.

9. The method of claim 1, wherein applying the selected subsets of the settings and data elements to the corresponding software images comprises modifying one or more of the software images in the set of multiple software images using the corresponding subset of the settings and data elements.

10. The method of claim 9, wherein modifying one or more of the software images in the set of multiple software images comprises:
   for each of the one or more software images, using the subset of the settings and data elements selected for the software image to modify one or more of:
   a dependency for the software image;
   a software library for the software image;
   a tool for the software image;
   metadata for the software image; or
   a setting for the software image.

11. The method of claim 9, wherein each of the software images includes a set of read-only layers, and
   wherein modifying one or more of the software images in the set of multiple software images comprises adding one or more layers to the set of read-only layers of the software image.

12. The method of claim 1, wherein selecting the set of multiple software images comprises selecting a predetermined set of one or more software images that corresponds to software of the particular server environment.

13. The method of claim 12, wherein the set of multiple software images includes one or more software images in addition to the one or more software images in the predetermined set.

14. The method of claim 1, wherein applying the selected subsets of the settings and data elements to the corresponding software images comprises associating each of the software images in the set of multiple software images with a corresponding configuration file.

15. A system comprising:
   one or more computers; and
   one or more computer-readable media storing instructions that, when executed, cause the one or more computers to perform operations comprising:
      storing, by the one or more computers, mapping data that maps settings and data elements from source server environments to containers of destination server environments, wherein the mapping data specifies different subsets of the settings and data elements from source server environments to be used in configuring different containers of destination server environments;
      obtaining, by the one or more computers, settings and data elements of a particular server environment that provides functionality that is not implemented as containers;
      selecting, by the one or more computers, multiple software images to use in providing a container-based implementation of the functionality of the particular server environment, the multiple software images being selected from a repository of container software images;
      for each of the multiple software images selected, using, by the one or more computers, the mapping data to select a subset of the settings and data elements of the particular server environment for configuring the software image; and
      applying, by the one or more computers, the selected subsets of the settings and data elements to the corresponding software images in the set of multiple software images, wherein the set of multiple software images is configured to operate together to provide the functionality of the particular server environment when the set of software images are run concurrently as containers.

16. The system of claim 15, further comprising creating a second server environment with the container-based implementation of the functionality of the particular server environment by creating a container for each of the software images in the set of multiple software images.

17. The system of claim 15, comprising transmitting the set of multiple software images to a server system, wherein the server system is configured to run the software images in the set concurrently as respective containers to provide the functionality of the particular server environment.

18. The system of claim 17, wherein transmitting the set of multiple software images to the server system comprises transmitting the set of multiple software images to the server system before applying a subset of the settings and data elements to the software image.

19. The system of claim 15, wherein applying the selected subsets of the settings and data elements to the corresponding software images comprises associating each of the software images in the set of multiple software images with a corresponding configuration file;
- wherein, for at least one of the software images in the set of multiple software images, the configuration file for the software image is based on the subset of settings and data elements selected for the software image; and
- wherein each of the software images is configured to access the associated configuration file when the software image is run as a container.

20. One or more non-transitory computer-readable media storing instructions that, when executed by one or more computers, cause the one or more computers to perform operations comprising:
- storing, by the one or more computers, mapping data that maps settings and data elements from source server environments to containers of destination server environments, wherein the mapping data specifies different subsets of the settings and data elements from source server environments to be used in configuring different containers of destination server environments;
- obtaining, by the one or more computers, settings and data elements of a particular server environment that provides functionality that is not implemented as containers;
- selecting, by the one or more computers, multiple software images to use in providing a container-based implementation of the functionality of the particular server environment, the multiple software images being selected from a repository of container software images;
- for each of the multiple software images selected, using, by the one or more computers, the mapping data to select a subset of the settings and data elements of the particular server environment for configuring the software image; and
- applying, by the one or more computers, the selected subsets of the settings and data elements to the corresponding software images in the set of multiple software images, wherein the set of multiple software images is configured to operate together to provide the functionality of the particular server environment when the set of software images are run concurrently as containers.

* * * * *